US011822110B2

(12) United States Patent
Menon

(10) Patent No.: US 11,822,110 B2
(45) Date of Patent: Nov. 21, 2023

(54) DIFFRACTIVE OPTIC FOR HOLOGRAPHIC PROJECTION

(71) Applicant: University of Utah Research Foundation, Salt Lake City, UT (US)

(72) Inventor: Rajesh Menon, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 528 days.

(21) Appl. No.: 16/971,464

(22) PCT Filed: Jul. 19, 2018

(86) PCT No.: PCT/US2018/042968
§ 371 (c)(1),
(2) Date: Aug. 20, 2020

(87) PCT Pub. No.: WO2019/164542
PCT Pub. Date: Aug. 29, 2019

(65) Prior Publication Data
US 2021/0033769 A1 Feb. 4, 2021

Related U.S. Application Data

(60) Provisional application No. 62/633,425, filed on Feb. 21, 2018.

(51) Int. Cl.
*G02B 5/32* (2006.01)
*G02B 27/42* (2006.01)
(Continued)

(52) U.S. Cl.
CPC ........... *G02B 5/32* (2013.01); *G02B 27/4205* (2013.01); *G03H 1/2286* (2013.01); *G03H 1/2294* (2013.01); *G03H 1/265* (2013.01); *G03H 2001/266* (2013.01); *G03H 2210/30* (2013.01); *G03H 2222/14* (2013.01);
(Continued)

(58) Field of Classification Search
None
See application file for complete search history.

(56) References Cited

U.S. PATENT DOCUMENTS 5,262,893 A 11/1993 Shrauger et al.
5,446,565 A 8/1995 Komma et al.
(Continued)

OTHER PUBLICATIONS

Abbasi et al.; "Studying the Recent Improvements in Holograms for Three-Dimensional Display." International Journal of Optics; Hindawi; vol. 2014; Article ID: 519012; 7 Pages.
(Continued)

*Primary Examiner* — Jennifer D. Carruth
(74) *Attorney, Agent, or Firm* — Thorpe North & Western, LLP

(57) ABSTRACT

Technology is described for methods and systems for a diffractive optic device (525) for holographic projection. The diffractive optic device can include a lens (535) configured to convey a hologram. The lens (535) further comprises a patterned material (510) formed with an array of cells having a non-planar arrangement of cell heights extending from a surface of the patterned material. The lens further optionally comprises a filling material (530) to fill gaps on both surfaces of the patterned material.

26 Claims, 41 Drawing Sheets

(51) Int. Cl.
*G03H 1/22* (2006.01)
*G03H 1/26* (2006.01)

(52) U.S. Cl.
CPC ..... *G03H 2222/16* (2013.01); *G03H 2223/19* (2013.01); *G03H 2223/23* (2013.01); *G03H 2240/54* (2013.01)

(56) References Cited

U.S. PATENT DOCUMENTS

| | | | |
|---|---|---|---|
| 7,348,104 | B2 | 3/2008 | Gil et al. |
| 7,667,819 | B2 | 2/2010 | Menon et al. |
| 8,634,119 | B2 | 1/2014 | Bablumyan et al. |
| 8,643,822 | B2 | 2/2014 | Tan et al. |
| 8,669,461 | B2 | 3/2014 | Menon |
| 8,958,137 | B2 | 2/2015 | Haussler |
| 9,110,291 | B2 | 8/2015 | Dominguez-Caballero et al. |
| 9,400,395 | B2 | 7/2016 | Travers et al. |
| 9,615,068 | B2 | 4/2017 | Smithwick |
| 9,715,216 | B2 | 7/2017 | Wiltshire et al. |
| 9,723,230 | B2 | 8/2017 | Menon |
| 2005/0007305 | A1 | 1/2005 | Johansen et al. |
| 2012/0033204 | A1 | 2/2012 | Bratkovski et al. |
| 2012/0224236 | A1* | 9/2012 | Rosen ............ G03H 1/0443 359/9 |
| 2012/0266937 | A1 | 10/2012 | Menon et al. |
| 2014/0030895 | A1 | 1/2014 | Menon et al. |
| 2015/0032402 | A1 | 1/2015 | Menon |
| 2015/0293499 | A1* | 10/2015 | Rosen ............ G03H 1/0841 359/9 |
| 2015/0360500 | A1 | 12/2015 | Lok |
| 2016/0187848 | A1* | 6/2016 | Yu ................ G11B 7/24062 264/1.33 |
| 2016/0301914 | A1 | 10/2016 | Shechtman et al. |
| 2016/0334758 | A1 | 11/2016 | Shaltout et al. |
| 2017/0052374 | A1 | 2/2017 | Waldern et al. |
| 2017/0106690 | A1 | 4/2017 | Lee et al. |

OTHER PUBLICATIONS

Buralli et al.; "Optical performance of holographic kinoforms." Applied Optics; vol. 28, No. 5; Mar. 1, 1989; pp. 976-983.
Choi et al.; "Multiphase computer-generated holograms for full-color image generation." Proceedings of SPIE; vol. 4659; 2002; pp. 242-249.
Deng et al.; "Metasurface Optical holography." Materials Today Physics; Elsevier; vol. 3; 2017; pp. 16-32.
Devlin et al.; "Broadband high-efficiency dielectric metasurfaces for the visible spectrum." PNAS; Applied Physical Sciences; Sep. 20, 2016; vol. 113 (38); 6 pages.
Ekberg et al.; "Multilevel phase holograms manufactured by electron-beam lithography." Optics Letters; May 15, 1990; vol. 15, No. 10; pp. 568-569.
Huang et al.; "Silicon multi-meta-holograms for the broadband visible light." Laser & Photonics Reviews; Wiley Online Library; 2016; vol. 10, No. 3; pp. 500-509.

Jesacher et al.; "Colour hologram projection with an SLM by exploiting its full phase modulation range." Optics Express; Aug. 18, 2014; vol. 22, No. 17; pp. 20530-20541.
Kim et al.; "Design and analysis of multi-wavelength diffractive optics." Optics Express; Jan. 23, 2012; vol. 20, No. 3; pp. 2814-2823.
Manolis et al.; "Reconfigurable Multilevel Phase Holograms for Optical Switches." IEEE Photonics Technology Letters; Jun. 2002; vol. 14, No. 6; 801-803.
Mohammad et al.; "Broadband Imaging with one planar diffractive lens." Scientific Reports 9, Article 2799 (2018); Feb. 12, 2018; pp. 1-6.
Mohammad et al.; "Enhancing photovoltaic output power by 3-band spectrum-splitting and concentration using a diffractive micro-optic." Optics Express; Optical society of America; Sep. 17, 2014; 7 pages.
Mohammad et al.; "Outdoor measurements of a photovoltaic systems using diffractive spectrum-splitting and concentration." AIP Advances 6, 095311 (2016); pp. 095311-1-095311-10.
Mohammad et al. .; "Full-color, large area, transmissive holograms enabled by multi-level diffractive optics." Scientific Reports; Jul. 19, 2017; pp. 1-6.
PCT Application No. PCT/US18/42968 Filing date Jul. 19, 2018; Rajesh Menon International Search Report dated Nov. 21, 2018; 11 Pages.
Qin et al.; "Optical color-image encryption in the diffractive-imaging scheme." Optics and Lasers in Engineering; Elsevier; vol. 77; 2016; pp. 191-202.
Tsai et al.; "Fabrication of spiral-phase diffractive elements using scanning-electron-beam lithography." Journal of Vacuum Science & Technology B, Nanotechnology and Microelectronics: Materials, Processing, Measurement, and Phenomena; Dec. 2007; vol. 25, Issue 6; Abstract.
Tsuchiyama et al.; "Full-color large-scaled computer-generated holograms using RGB color filters." Optics Express 2016; Feb. 6, 2017; vol. 25, No. 3; 15 Pages.
Wang et al.; "A new class of multi-bandgap high-efficiency photovoltaics enabled by broadband diffractive optics." Progress in photovoltaics: Research and Applications; 2014; 7 Pages.
Wang et al.; "Chromatic-aberration-corrected diffractive lenses for ultra-broadband focusing." Scientific Reports; Feb. 12, 2016; pp. 1-7.
Wang.; "Computational Diffractive Optics for Imaging and Nonimaging Applications." The University of Utah Graduate School; Dec. 2016; 24 Pages.
Wei et la.; "Double color image encryption scheme based on off—axis holography and maximum length cellular automata." Optik; Elsevier; vol. 145; 2017; pp. 407-417.
Zheng et al.; "Computer-generated kinoforms of real-existing full-color 3D objects using pure-phase look-up-table method." Optics and Lasers in Engineering; Elsevier; vol. 50; 2012; pp. 568-573.
Käempfe et al.; "Design and Fabrication of Stacked, Computer Generated Holograms for Multicolor Image Generation;" Applied Optics; (2007); pp. 5482-5488; vol. 46, Issue 22; <doi: 10.1364/AO.46.005482 >.
Mendlovic; "Toward a Super Imaging System [Invited];" Applied Optics; (2013); pp. 561-566; vol. 52, Issue 4; <doi: 10.1364/AO.52.000561 >.

* cited by examiner

DIFFRACTIVE OPTIC FOR HOLOGRAPHIC PROJECTION

RELATED APPLICATIONS

This application claims the benefit of U.S. Provisional Application No. 62/633,425 filed on Feb. 21, 2018, entitled DIFFRACTIVE OPTIC FOR HOLOGRAPHIC PROJECTION, which is incorporated herein by reference.

GOVERNMENT INTEREST

This invention was made with government support under Grant No. NNX14AB13G awarded by NASA and N66001-10-1-4065 awarded by DOD/DARPA. The government has certain rights in the invention.

BACKGROUND

Diffractive optic elements are typically thin phase elements that operate by means of interference and diffraction to produce arbitrary distributions of light or to aid in the design of optical systems. For example, diffractive lenses can be used to reduce the number of elements in conventional lens systems and eliminate the use of exotic materials in correcting chromatic aberrations.

Diffractive optics sculpt the propagation of light to generate complex intensity and phase patterns downstream by imposing a phase and/or intensity pattern on the incident light. Phase-only diffractive optics affect the phase and are lossless. Binary-phase diffractive optics impose two-levels of phase, which significantly eases the fabrication of such elements. The phase shift is achieved via an optical-path difference between neighboring regions. However, such optics inherently exhibit undesirable chromatic aberrations. Generally, previous holographic diffractive elements have been designed to operate optimally at a single wavelength, while efficiency and image contrast have been reduced at other wavelengths.

SUMMARY

Diffractive optic devices for holographic projections, as well as systems and methods for manufacturing such optics and systems and methods for using such optics are described. In one aspect, a diffractive optic device can comprise a lens, such as a planar lens, that is configured to convey a hologram or holographic image. The hologram refers to an image or plurality of images. The lens can comprise a patterned material formed with an array of cells having a non-planar arrangement and having varied cell heights extending from a surface of the patterned material. The patterned material can have a gap or variation in the cell heights such that an upper profile will not form a flat surface. Accordingly, an optional filling material can be used to fill gaps on one or both surfaces of the patterned material. In some cases, the filling material can be formed or shaped to provide a flat surface of the lens. The hologram can be conveyed in transmission by incoming light incident upon the diffractive optic device. Alternatively, the hologram can be passively conveyed by incoming light reflecting off the cell heights of the patterned material.

In one example, the filling material has a refractive index different from the patterned material. The hologram can be passively conveyed by incoming light reflecting off the cell heights of the patterned material. In one example, the filling material is transparent to the incoming light. The filling material need not be transparent for embodiments where the hologram is conveyed in reflection. The incoming light can be visible light, near infrared (IR) light, IR light, ultraviolet (UV) light, Terahertz radiation, Microwave radiation, Radio waves, and any portion of the electromagnetic spectrum and combinations thereof. The incoming light can be narrow-band light, broadband light, light with narrow angle of incidence, light with broad angles of incidence, and/or polarized, partially polarized or unpolarized light, and combinations thereof.

In one example, the lens can be embedded in an object. For example, the object can be a display, a currency note, a credit card, an identification card, a ticket, a label, a document, and packaging. The object can be composed of a multi-layer stack and the lens is embedded between at least two of the layers. In some cases, the device can be passive such that no electrical power source or pathways (e.g. electrodes) are included to produce light or modify the lens configuration. Such passive devices can be useful for applications such as, but are in no way limited to, currency notes, packaging authentication (e.g. pharmaceutical packaging, fashion labels, product verification, etc), credit cards, identification cards, legal documentation, tickets, driver's licenses, passports, visas, tax stamps, brand identification, advertising labels, branding labels, and any physical object of high value.

In another example, the cell heights comprise preselected cell heights for a substantially optimized performance metric of the diffractive optic across a plurality of discrete wavelengths. Alternatively, the cell heights can be substantially optimized across a broadband of wavelengths. In some cases, broadband wavelengths can include visible light, infrared, and/or the like. Optimization across visible light, for example, can result in the ability to design the hologram for full color holographic images and also utilize the optic device without a requirement of specific filtered or narrow wavelength light.

Furthermore, the cell heights can be designed and preselected to have cell heights such that the hologram is formed in at least one of a single plane, multiple discrete planes, and a continuous 3D volume. Similarly, the pattern of cell heights within the non-planar array can be designed such that the hologram is a function of at least one of wavelength, incident angle, polarization, or other electromagnetic field property. There are many ways to constitute a figure of merit with different objectives. For example, a weighted sum of the diffraction efficiencies can be formed for the different images.

A method for manufacturing a lens for a diffractive optic device which produces holographic images is also disclosed. The lens can be formed on a surface of a substrate. A patterned material is formed on a surface of a substrate with an array of cells having a non-planar arrangement of cell heights extending from the surface of the substrate such that light reflected from patterned material forms a hologram. In some cases the patterned material can be formed by deposition processes including, but not limited to, printing, lithography, grayscale optical-lithography, grayscale electron-beam lithography, multi-level optical lithography, multi-level electron-beam lithography, focused-ion-beam lithography, projection optical lithography, 3D printing, and the like. Alternatively, the patterned material can be formed via etching (e.g. photolithography) or other subtractive processes. The process can involve both pattern formation (lithography), and then pattern transfer (etching or deposition and lift-off). Generally, a master pattern is made using these steps. Then, a replica of this master pattern is made using electroforming, casting, etc. Then, this replica is used to create copies by embossing, UV embossing, thermal embossing, hot-stamping, roll-to-roll or plate-to-plate or plate-to-roll or roll-to-plate stamping or nanoimprinting.

An optional filling material can also be deposited to fill gaps formed in the pattern material. The filling material is deposited to form a flat surface above the arrangement of cell heights and the lens is a planar lens.

In one example, the filling material has a refractive index different from the patterned material. In one example, the hologram is passively conveyed by incoming light reflecting off the cell heights of the patterned material. The filling material can be transparent to the incoming light.

In one example, the lens is manufactured by embedding the diffractive optic in an object. The lens can be embedded in between layers of a multi-layer stack object. For example, the object can be a display, a currency note, a credit card, an identification card, a ticket, a label, a document, and packaging.

In one example, the hologram is a wavelength-multiplexing hologram such that a different illumination wavelength can create a different image. In one example, the hologram is an angle-multiplexing hologram such that a different angle of illumination can result in a different image. In one example, the hologram can form different images in different planes beyond the device. For example, this can be used to showcase animation by moving the device back and forth from a screen.

It should be appreciated that the devices described herein can be used as a lens for imaging or forming images. The images may be formed in other devices such as a regular camera, a wide-field of view camera, or any other imaging system such as a telescope, microscope, etc. The present technology may be used for non-imaging applications such as a luminaire for lighting or for light concentration. For example to the light may be collected from one fiber to another fiber.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention. Furthermore, the above summary describes various optional features such that nothing in this section should be used to constrain the scope of the invention which is explicitly outlined by the claims.

Figure 1A:
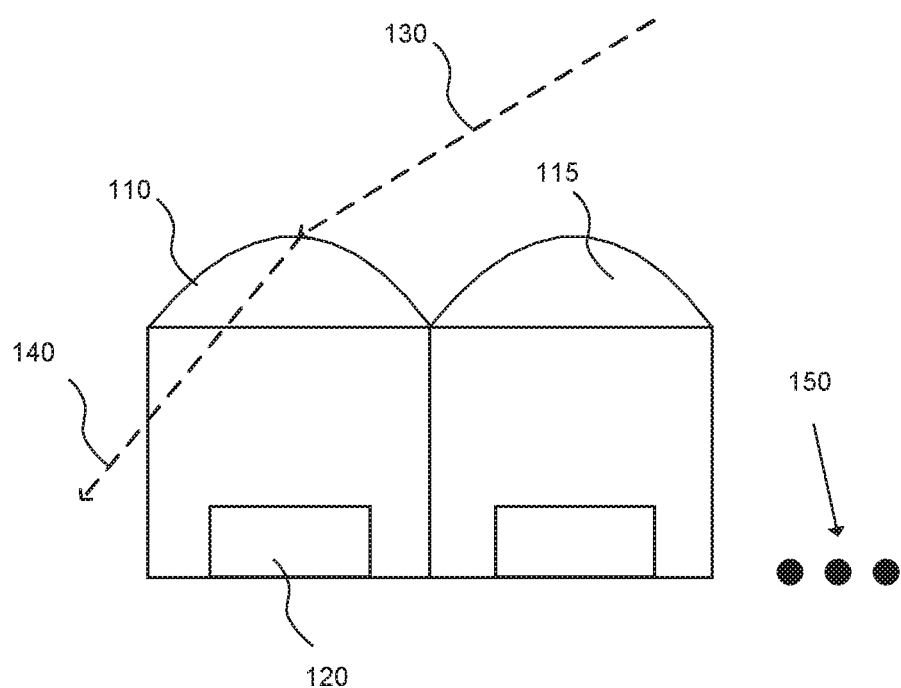
FIG. 1A illustrates a microlens-array in accordance with the current state of the art.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a lens" includes reference to one or more of such devices and reference to "directing" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Diffractive Optic for Holographic Projection

The present technology enables full color (broadband) holographic image projections for static or dynamic images. This is achieved with almost no absorption losses, thereby enabling high transmission and/or reflection efficiencies. The devices of the present technology can operate in transmission or in reflection. Furthermore, the devices can be designed for any part of the electromagnetic spectrum using common principles outlined herein. Similarly, the holographic images can be 2D or 3D. Additionally, the system and method can be used to form a holographic image which can also be in a single plane, multiple discrete planes, or a continuous 3D volume.

One embodiment of the present technology is for a planar micro-lens array in the form of a computer-generated hologram incorporated into image sensors. Benefits of the present technology include a decrease in the thickness of image sensors, a reduction in the material used for the micro-lenses, and an increase in the chief-ray angle of the sensor. These advantages are possible because it is easier to obtain high-numerical-aperture (high-NA) planar lenses than conventional refractive lenses. More specifically, conventional refractive lenses involve complex continuous profile with very small radius of curvature for high-NA and become very difficult to fabricate, and their thickness increases with increasing diameter. The planar microlens disclosed herein can be fabricated using single step imprint lithography or multi-step optical lithography and the process can be fully CMOS compatible. Accordingly, the thickness of the planar microlens does not increase with its diameter.

In one example, a diffractive optic device is employed and includes a lens to convey a hologram. The lens can include a patterned material that is formed with an array of cells. The cells can be arranged at different heights extending from a surface. The cells having different heights collectively form the lens. The patterned material of the lens can be covered with an optional filling material. The filling material serves to fill in gaps in portions of the surface of the patterned material where the gaps are caused by the difference in heights of the cells. The hologram device once formed, can receive light that is passively conveyed and then reflected off the surface of the patterned material to form a holographic image. In some cases, the hologram can include more than one lens.

The filling material can have a different refractive index from the patterned material. The filling material can form a flat surface above the height of the patterned material to form the planar lens. The filling material can be composed of a material that is also transparent to incoming light or radiation. The design of the diffractive optic device can model the effect of light traveling through both the patterned lens and the filling material to avoid changing the hologram or image produce.

Incoming light, or light incident upon the hologram device can be visible light, near infrared (IR) light, IR light, ultraviolet (UV) light, Terahertz radiation, microwave radiation, radio waves, narrowband light, broadband light, light with narrow angle of incidence, light with broad angles of incidence, polarized, partially polarized or unpolarized light, and any portion of the electromagnetic spectrum and combinations thereof.

The cell heights of the patterned material can be preselected cell heights. For example, preselected cell heights can be a substantially optimized performance metric of the diffractive optic across a plurality of discrete wavelengths. The cell heights can also be optimized across a broadband of wavelengths. Preselected cell heights can also be selected such that the hologram is a function of any one of wavelength, incident angle, or polarization (e.g. the hologram image varies according to these factors). Preselected cell heights can also be selected such that a chief ray acceptance angle of a sensor is increased. Design criteria and methods are described in more detail below. However, as a general guideline the cell heights can range from about 0 nm to about 30 μm, and most often from 0 nm to 10 μm. Similarly, the cell sizes (e.g. width and length in a lens plane) can range from 200 nm to 5000 nm and most often from 500 nm to 2000 nm.

The lens used to form the hologram device can often be embedded in another object. For example the object can be a multi layer stack and the lens is one of the layers in the multi layers. The object can be any number of objects including a display, a currency note, a credit card, an identification card, a ticket, a label, a document, product packaging, and the like.

FIG. 1A depicts a block diagram for the current state of the art for a microlens-array (also referred to as on-chip lens or OCL) as is used in image sensors to improve light collection efficiency. Although there are some variations in specific configuration, these current micro-lens arrays typically include multiple microlenses, e.g. a microlens 110 and a microlens 115. The microlens-array can include any number of microlenses tiled in a one dimensional (1D) or two dimensional (2D) array as depicted by the continuation mark 150. A ray 130 can be incident on a surface of the microlens 110 and be diffracted as ray 140. The angle of ray 130 can be greater than a sensor chief-ray angle. The ray 140 may not impinge on the sensor 120. Each microlens in the microlens-array can have an associated sensor that can be described as a pixel active area. In FIG. 1A, the ray 140 is depicted as missing the sensor 120. Therefore, the sensor 120 does not detect the ray 140. This illustrates one limitation of these arrays for collecting only a portion of incoming light.

Figure 1B:
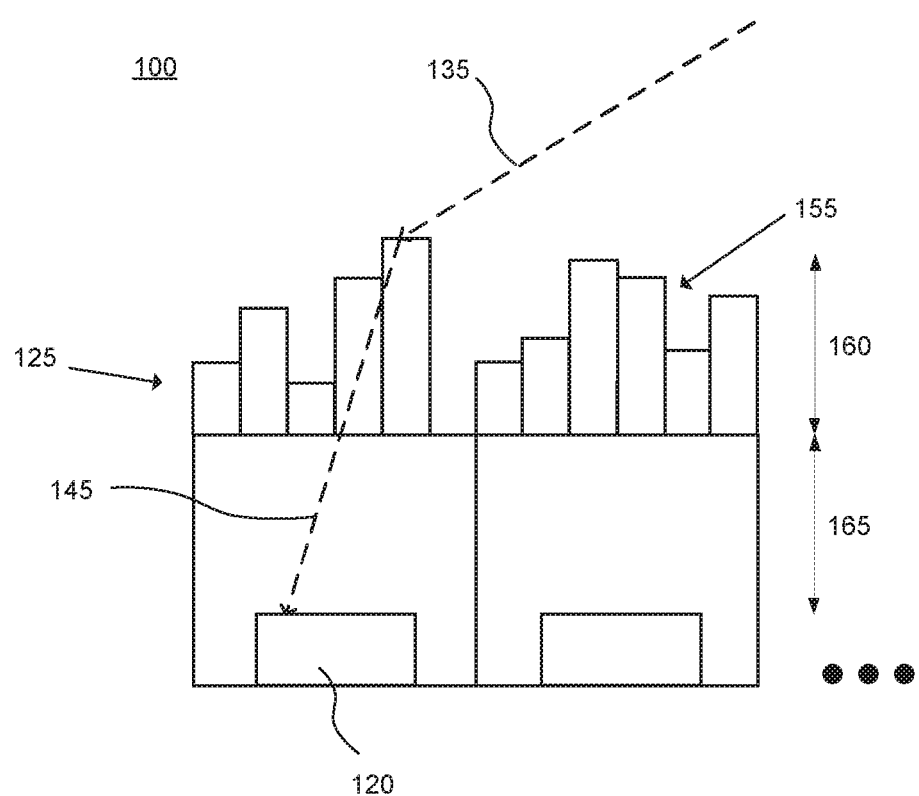
FIG. 1B illustrates a planar micro-lens in accordance with an embodiment of the present invention where an array corresponds to each sensor pixel.

FIG. 1B depicts a simplified diagram for the present technology of a planar micro-lens that can be used to improve the performance of the image sensor as described below. FIG. 1B depicts a planar micro-lens 125 and a planar micro-lens 155 that form an array of planar micro-lenses 100. Despite only illustrating two, the planar micro-lens array can include any number of planar micro-lenses in a 1D or 2D array. In one embodiment, two or more lenses or arrays can be stacked to create a 3D array. The lenses or arrays can be stacked in parallel to improve performance. The planar micro-lens 125 comprises different surfaces positioned at heights that are different from one another. The planar micro-lens 125 can be 1D or 2D. A ray 135 can impinge on the surface of the planar micro-lens 125 and be diffracted as ray 145. The ray 145 is depicted as impinging on the surface of a sensor 120 which may have all the same features and capabilities of the sensor 120 of FIG. 1A. The thickness 160 of the planar micro-lens 125 or the planar micro-lens 155 can be adjusted to increase or decrease the thickness. The thickness 165 between the planar micro-lens 125 and the sensor 120 can be adjusted to increase or decrease the overall device thickness.

In one example, of the present technology is for the use of planar lenses to reduce the size, weight and alignment requirements for imaging and non-imaging systems. The planar lens can be designed to correct for all desired imaging aberrations such as spherical aberrations, chromatic aberrations, coma, trefoil, etc. In conventional imaging systems, such aberrations are corrected by using multiple lens elements. This can be corrected using a single element, and the number of optical elements are thus reduced in an imaging system. In addition, higher-NA lenses can be achieved, and it is possible to shrink the thickness of the overall imaging system as well. Reducing the number of optical elements also reduces the cost and complexity of precision alignment during manufacturing. Note that the lenses can be used in reverse to collimate light sources and other non-imaging applications as well. As illustrated in FIG. 1B, the chief ray acceptance angle of the sensor 120 can be increased by the planar micro-lens 125. Therefore, in some cases one or more figures of merit can include an increase in this chief ray acceptance angle.

Although multiple elements are depicted in FIG. 1B, it is understood that these elements can be formed on the same substrate (for example of two surfaces etched from a wafer) or glued together and also onto conventional lenses (hybrid optical systems are also covered by this disclosure that combine flat lenses of the present technology with conventional lenses—refractive, diffractive or reflective). Notably, although the invention is described as a planar lens, cells having varied cell heights fall within a non-planar cell height arrangement within an overall planar lens device.

Figure 2:
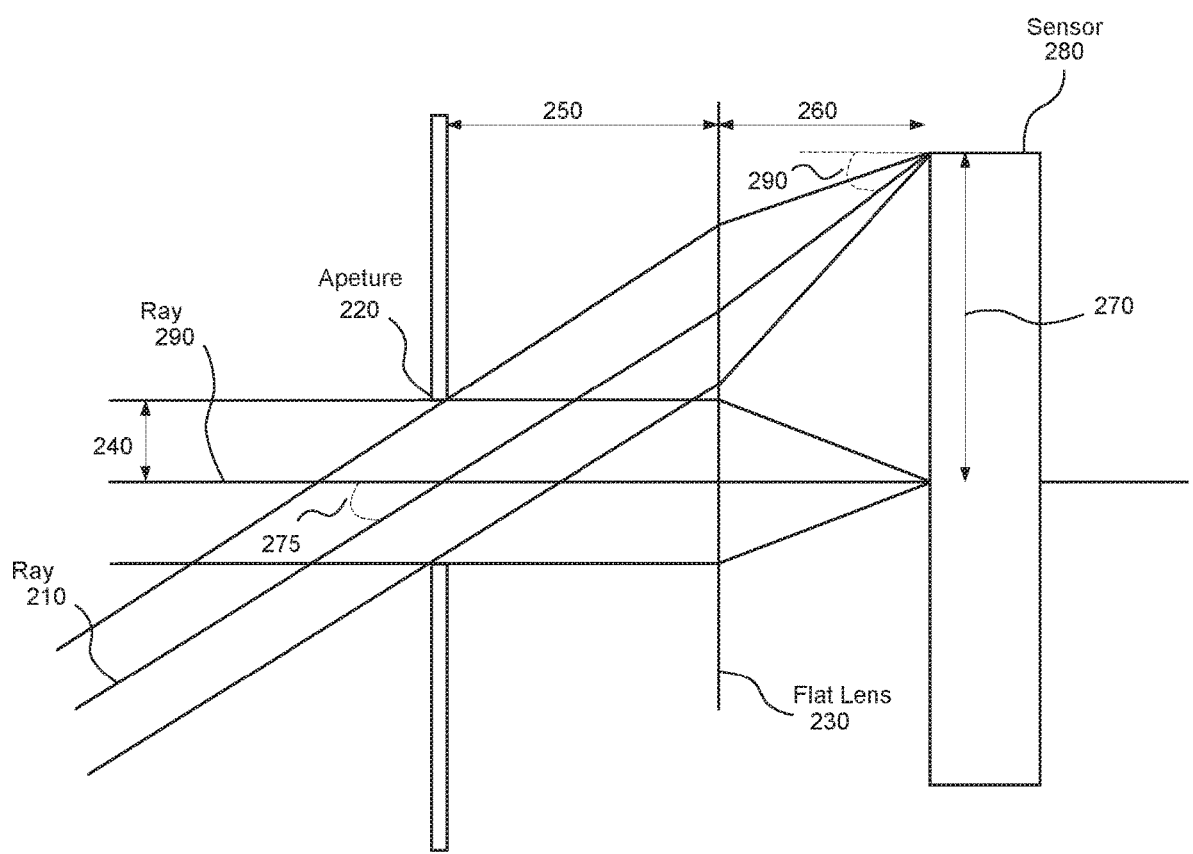
FIG. 2 illustrates a flat-lens with aperture for imaging in accordance with an embodiment of the present invention.

FIG. 2 depicts a schematic diagram for a flat lens 230 with aperture 220 for imaging. One approach to a single-element imaging system is to use an aperture 220 as illustrated in FIG. 2. The aperture in combination with the flat lens 230 can then ensure that the incoming largest chief-ray, such as ray 210, matches the chief-ray-angle (CRA) specification of a sensor 280 such as an image sensor. For example, the image sensor can be a conventional image sensor. However, this does not reduce the thickness of the imaging system. The angle 290 depicts the CRA angle of the ray 210 at the ray 210 impinges upon a surface of the sensor 280 after the ray 210 passes through the flat lens 220. Distance 250 represents the distance between the flat lens 230 and the aperture 220. Distance 260 represents the distance between a sensor 280 of the ray 210 and the flat lens 230. Ray 290 is a ray that passes through the aperture 220, is focused by the flat lens 220 and impinges on the sensor 280. Distance 270 is the distance between where the ray 210 impinges on the sensor 280 and the ray 240 impinges on the sensor 280. The distance 240 can be measured by p=z*tan(asin(NA)) where z is the distance 260 and a is the distance 250. The angle 275 can be measured by the field of view (FOV) divided by two.

Figure 3:
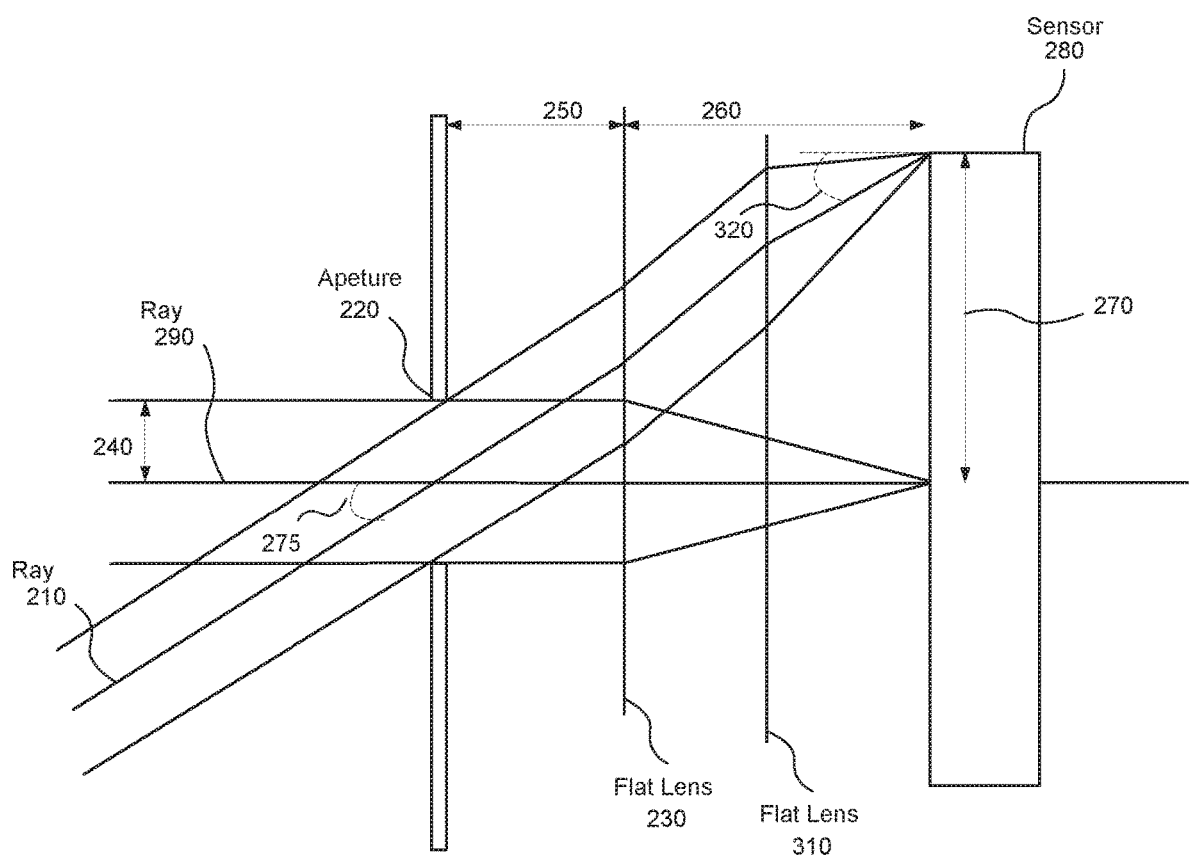
FIG. 3 illustrates two flat lenses that can be used with the aperture to reduce the overall thickness in accordance with an embodiment of the present invention.

By adding a second flat lens it is possible to reduce the distance between the last lens and the sensor and thereby reduce the overall thickness of the imaging system as is illustrated in FIG. 3. However, this still suffers from the use of an aperture, which reduces the amount of light entering the system.

FIG. 3 depicts a schematic diagram for two flat lenses, including the flat lens 230 and a flat lens 310 that can be used with the aperture to reduce the overall thickness. It should be appreciated that FIG. 3 has some of the same features and components of FIG. 2. In FIG. 3, the ray 210 passes through both the flat lens 230 and the flat lens 310 before impinging on the sensor 280. By passing through both the flat lens 230 and the flat lens 310 the combined thickness of the distances 250 and 260 may be reduced as compared to FIG. 2.

Figure 4:
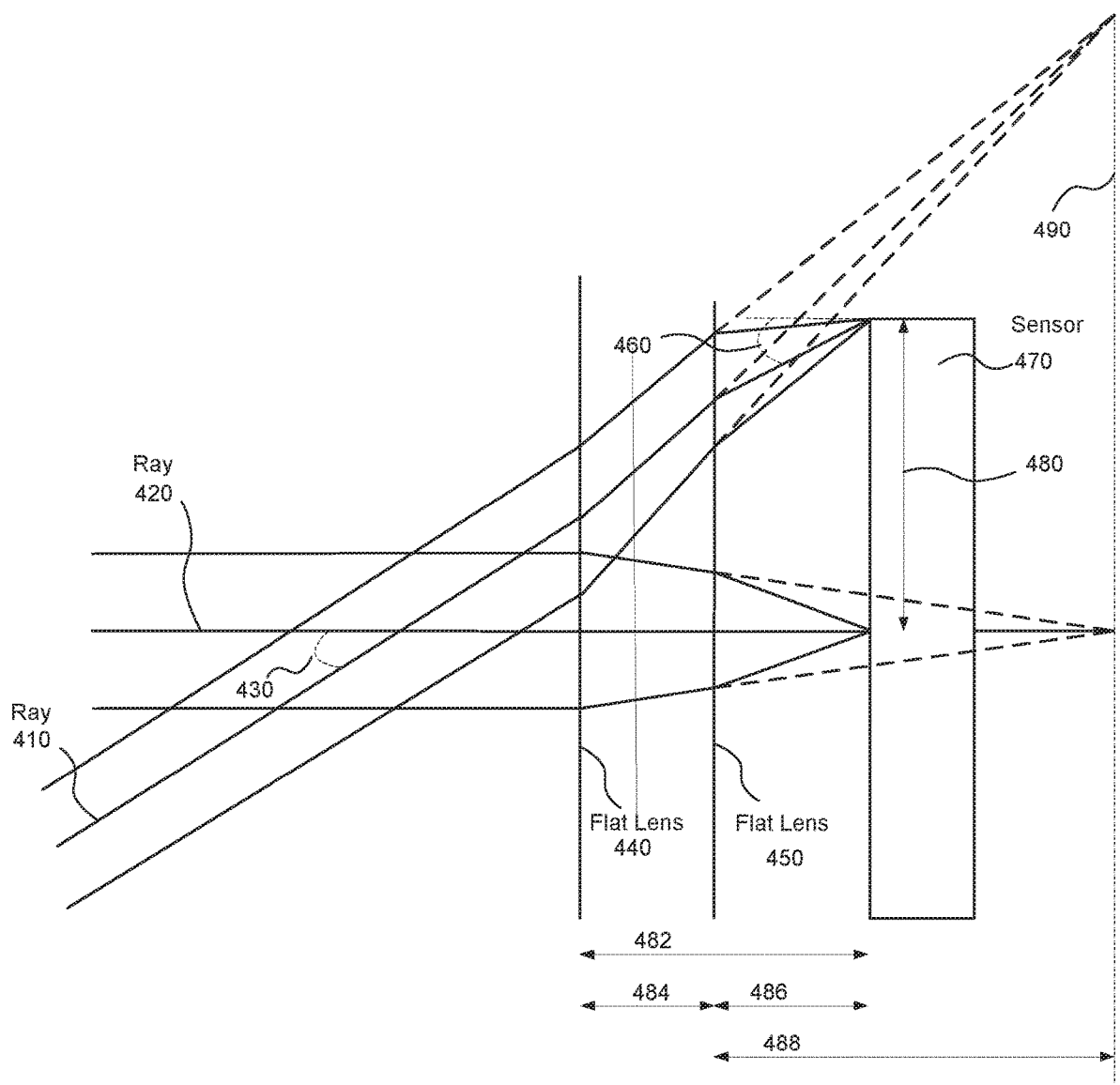
FIG. 4 illustrates two-flat-lens configuration for a thin imaging system in accordance with an embodiment of the present invention.

This problem can be mitigated by using properly designed two flat lenses as illustrated in FIG. 4. This embodiment can achieve reduced thickness without compromising image quality. With careful design of the planar lens (by adjusting the figure of merit during optimization), it is possible to achieve all the advantages listed above. More than two flat lenses can also be used.

FIG. 4 depicts a schematic diagram for a two-flat-lens configuration for a thin imaging system. For example, in this embodiment, a two lens arrays can be used including a flat lens 440 and a flat lens 450. Multiple flat optical lenses can be designed to collectively achieve a final optical performance metric. The lens arrays can typically be oriented parallel and adjacent to one another. A ray 410 can pass through both the flat lens 440 and the flat lens 450 and then impinge on a sensor 470. If the ray 410 did not pass through the flat lens 450 then the ray 410 would converge on a plane 490. A ray 420 passes through both the flat lens 440 and the flat lens 450 and impinges on the sensor 470. If the ray 420 did not pass through the flat lens 450 then the ray 410 would converge on a plane 490. The angle 430 is the angle between the ray 410 and the ray 420 and may be referred to as 0. The angle 460 is the angle at which the ray 410 impinges upon the sensor 470 after passing through the flat lens 450 and may be referred to as a.

A distance 480 refers to the distance between the point on the senor 470 upon which the ray 410 impinges and a point on the sensor 470 upon which the ray 420 impinges. A distance 482 refers to the distance between the flat lens 440 and the sensor 470. A distance 484 refers to the distance between the flat lens 440 and the flat lens 450. A distance 486 refers to a distance between the flat lens 450 and the sensor 470. A distance 488 refers to the distance between the flat lens 450 and the plane 490. Table 1 gives example values for the two-flat-lens configuration.

TABLE 1

| | |
|---|---|
| Max (α) | 33.9 Degrees |
| Max(θ) | 39 Degrees |
| (Distance 480)/2 | 5.868 mm |
| Distance 482 | 3.7 mm |
| Flat Lens 440 | 4 mm |
| Flat Lens 450 | 3 mm |
| Distance 484 | 2.9 mm |

Figure 5A:
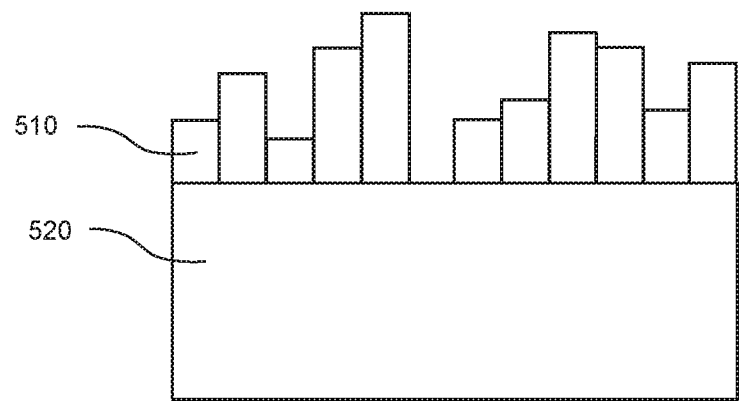
FIG. 5A illustrates a patterned surface on a substrate in accordance with an embodiment of the present invention.
Figure 5B:
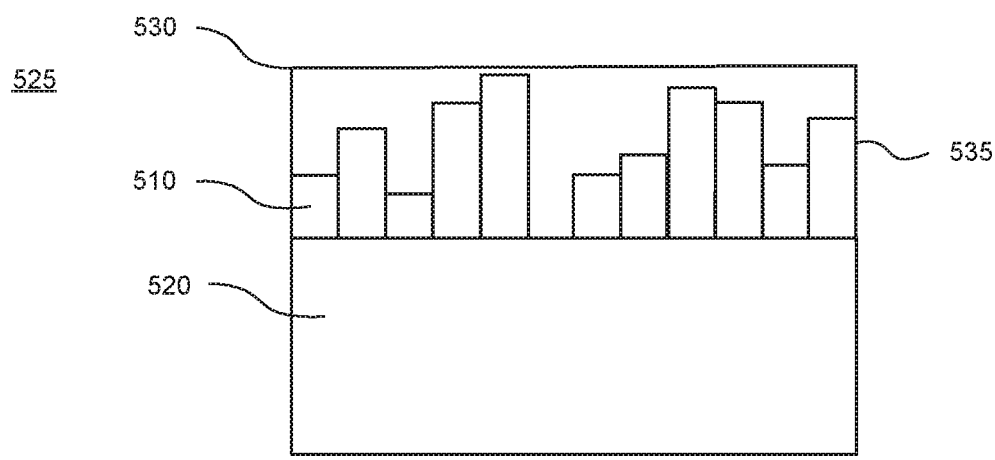
FIG. 5B illustrates a flat lens in accordance with an embodiment of the present invention.
Figure 5C:
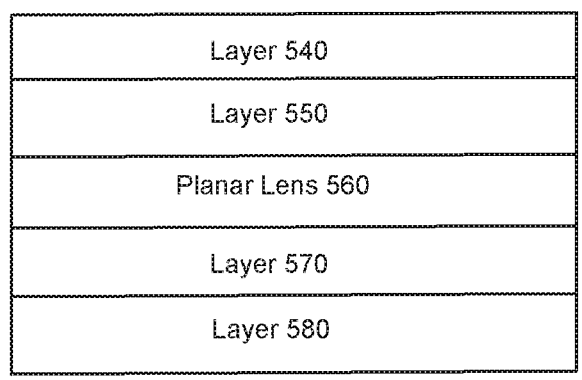
FIG. 5C illustrates a flat lens that can be embedded inside other multi-layer stack structures in accordance with an embodiment of the present invention.

The flat lens 440 and the flat lens 450 can be formed on opposing sides of a common substrate, formed on separate substrates which are separated by a suitable medium, or separated by physical layers as illustrated in FIGS. 5A-C.

FIG. 5A depicts a schematic diagram for a planar lens with a patterned surface that can be used for a holographic image in accordance with embodiments of the present technology. FIG. 5A depicts a substrate 520 that is attached or coupled to a patterned surface 510. FIG. 5B depicts a schematic diagram of a device 525 of a flat lens or a planar lens in accordance with embodiments of the present technology that can be embedded inside other multi-layer stack structures. FIG. 5B depicts the patterned surface 510 of FIG. 5B that has been encased or covered with a material 530 with a flat surface. The patterned surface and then material may be referred to as a lens 535. The material 530 can allow light or other radiation to pass through the material. The flat lens can be made flat on both surfaces by filling the gaps with material that has refractive index difference from the patterned material. In one example, a planar lenses, such as is depicted by FIG. 5B, can be embedded inside a multi layer device as is depicted in FIG. 5C. FIG. 5C is a block diagram of a multi layer device including a layer 540, a layer 550, a layer 570, and a layer 580. A planar lens 560 can be the same as the planar lens depicted in FIG. 5B can be a layer of the multi-layered device. The multi-layered device can be a device such as displays, currency notes, packaging labels, etc. The planar lens 560 can be embedded directly into multi-layer stacks as within a display (liquid crystal display, organic light-emitting diode, etc.) or within a currency note, credit card, identification card, tickets, labels, packaging (e.g. pharmaceutical, fashion, and the like), etc. The layers in the multi-layered device can each be transparent to light to allow the planar lens to function. In many cases, these lenses are advantageous because they reduce the overall thickness and material usage (compared to conventional refractive lenses). In currency notes, credit cards, etc. they can be used to create attractive images in reflection or transmission (as a computer-generated hologram). The lenses can be designed for narrowband, broadband, narrow angle of incidence, broad angles of incidence, polarization sensitivity, etc. All these properties can be specified in the figure of merit during optimization.

Notably, the present technology can also be applied to any wavelength regime as long as the materials used are transparent to the radiation of interest. This is particularly important for visible, near-IR, IR, UV, etc. spectral regimes. Examples are also illustrated in FIG. 6.

Figure 6:
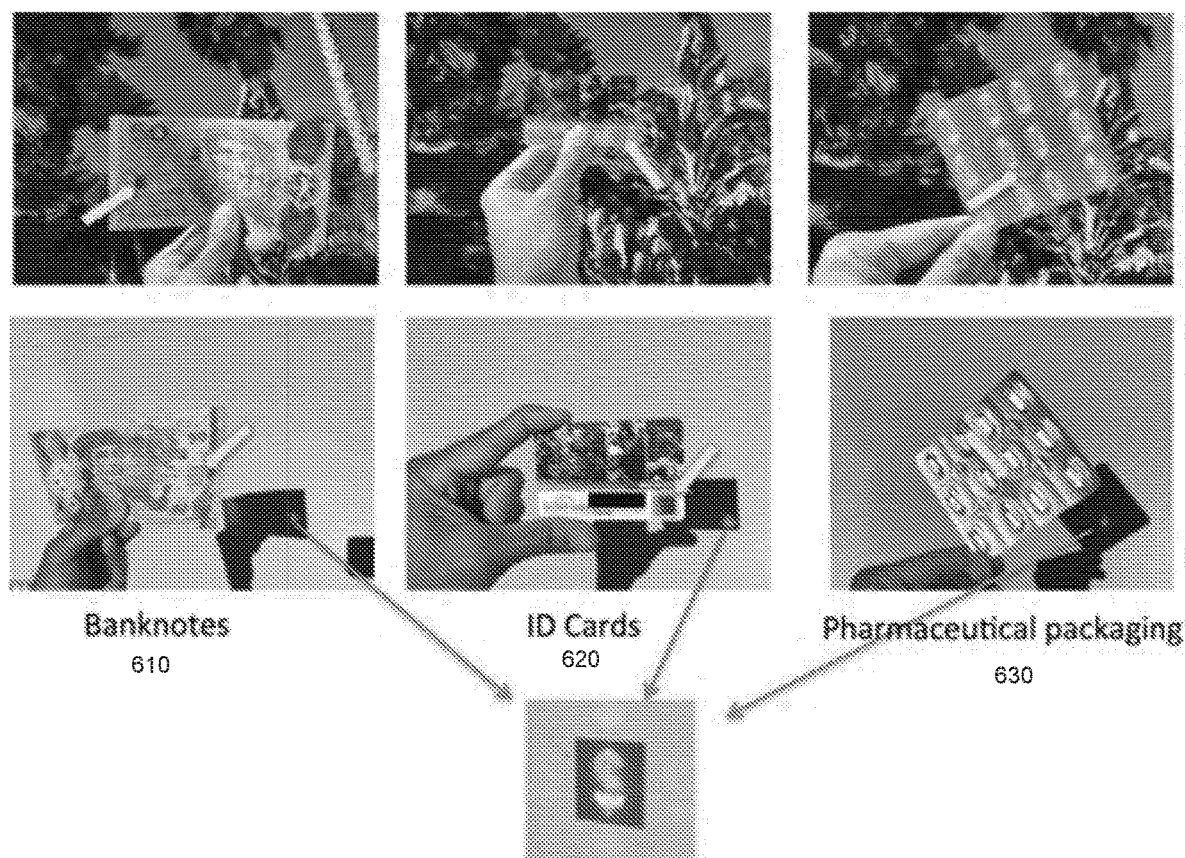
FIG. 6 illustrates photographs for applications of the present technology.

FIG. 6 depicts a block diagram with photographs for applications of the present technology. The computer generated hologram (CGH) can be incorporated directly into banknotes 610, ID cards 620 or pharmaceutical packaging 630. Yellow arrows indicate the locations of the CGH in each photo (incorporated by manually gluing CGH onto a cut-out window). When illuminated by a broadband source (like the sun or a flash light of a mobile device or any light source), it projects an easily recognizable full-color image as indicated by the example at the bottom. These images can also be viewed by holding them between a viewer's eye and a light source.

Figure 7A:
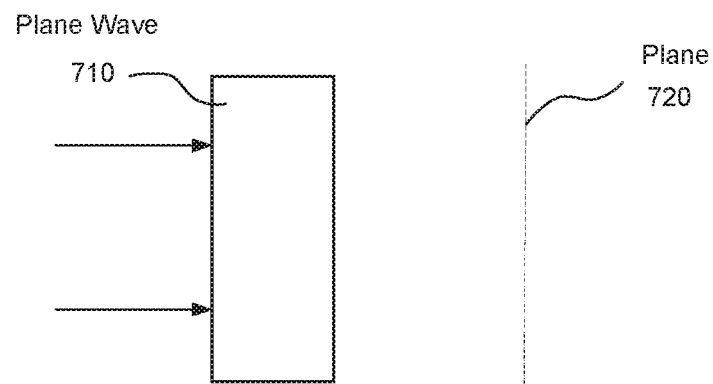
FIGS. 7A-F illustrates designing the computer generated hologram (CGH) for different illumination sources in accordance with an embodiment of the present invention.
Figure 7B:
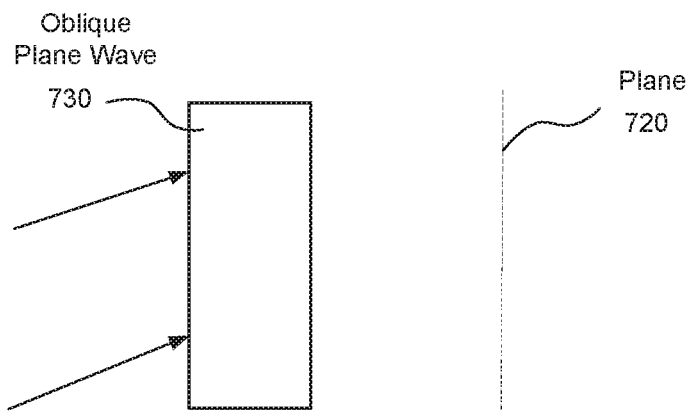
Figure 7C:
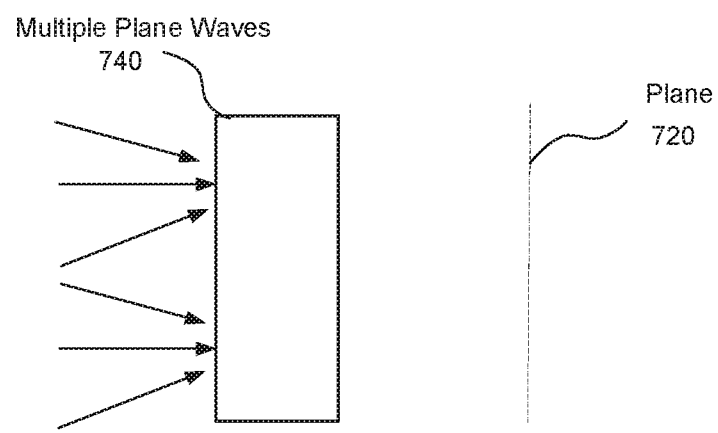

FIGS. 7A-F depict block diagrams for designing the CGH for different illumination sources. A use of CGH with plane-wave sources, oblique plane wave sources, point sources, multiple point sources, and extended sources is described below. Note that all light sources can be narrowband or broadband. The present technology can also work well with broadband illumination. The CGH described in the present technology can be designed for collimated plane wave as illustrated in FIG. 7A. FIG. 7A depicts a plane wave 710 where an image is formed on a plane 720. In each of the FIGS. 7-F, an image can be formed on the plane 720. In FIG. 7B the incident plane wave can be at an oblique angle as depicted by an oblique plane wave 730. FIG. 7C depicts multiple plane waves 740, which represents a diffuse illumination source of light. In designing a CGH using an oblique plane wave or multiple plane waves, care must be taken to design the minimum feature size and the image distance of the CGH such that the resulting image is sharp. This is achieved by using the appropriate figure of merit during optimization.

Figure 7D:
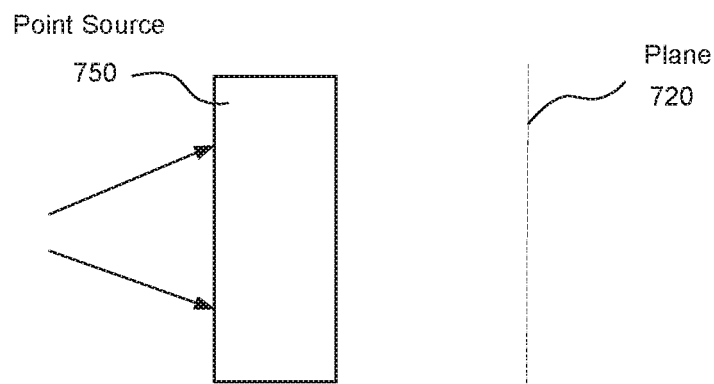
Figure 7E:
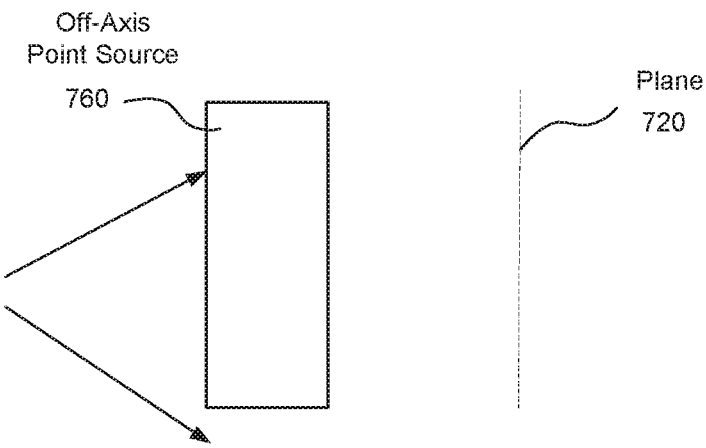
Figure 7F:
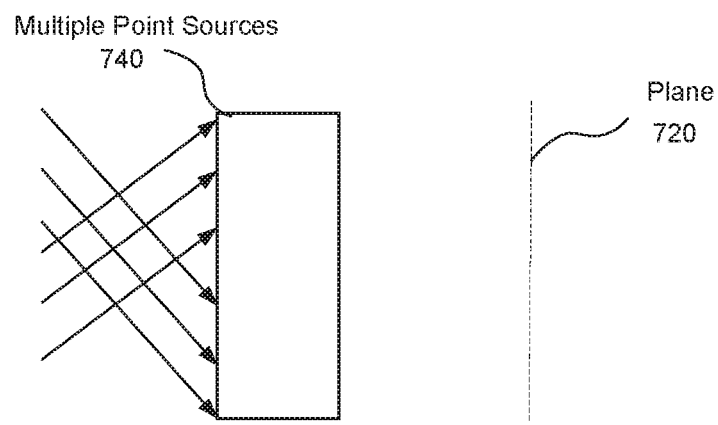

FIG. 7D depicts a CGH that is designed with a point source 750 that is used for point-source illumination. FIG. 7E depicts an off-axis point source 760 that is off-axis as compared to the point source 750 of FIG. 7D. FIG. 7F depicts multiple point sources 740 which represent an extended source for the CGH. For example, the multiple point source 740 can be light emitting diodes (LEDs). The use of LEDs as opposed to lasers can result in significant cost and power savings. Note that uniformity or other criteria (weights) for the different plane waves or point sources can be incorporated into the design process.

Figure 8A:
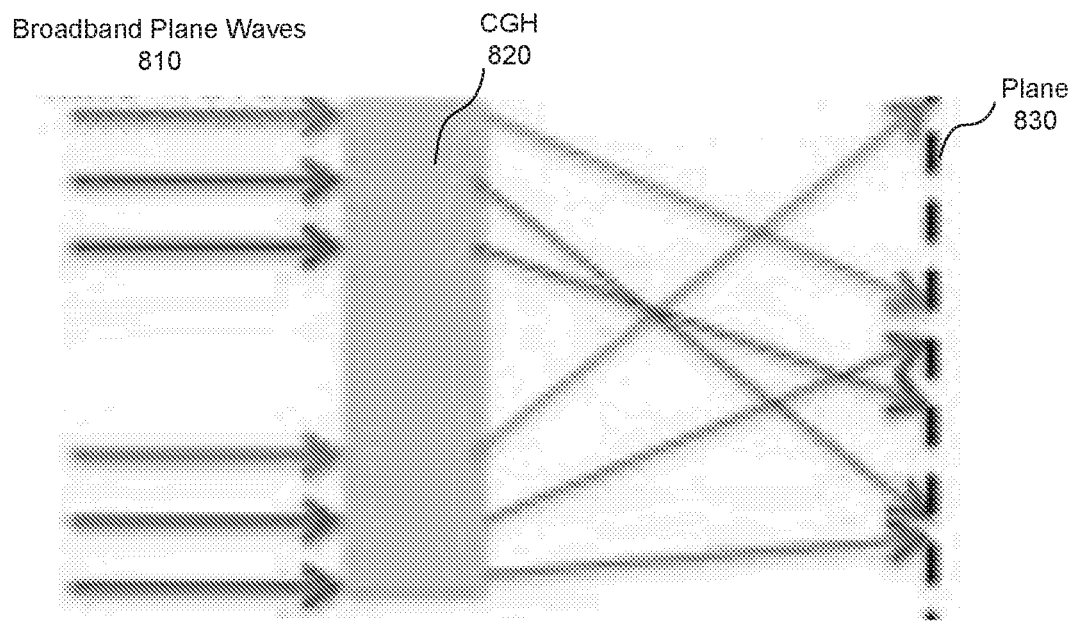
FIGS. 8A-C illustrate illumination conditions in accordance with an embodiment of the present invention.
Figure 8B:
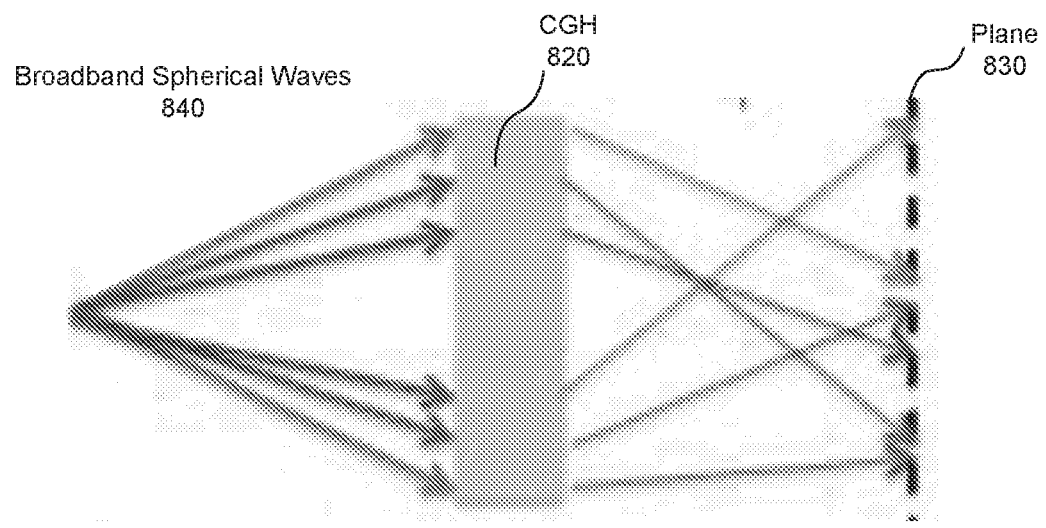
Figure 8C:
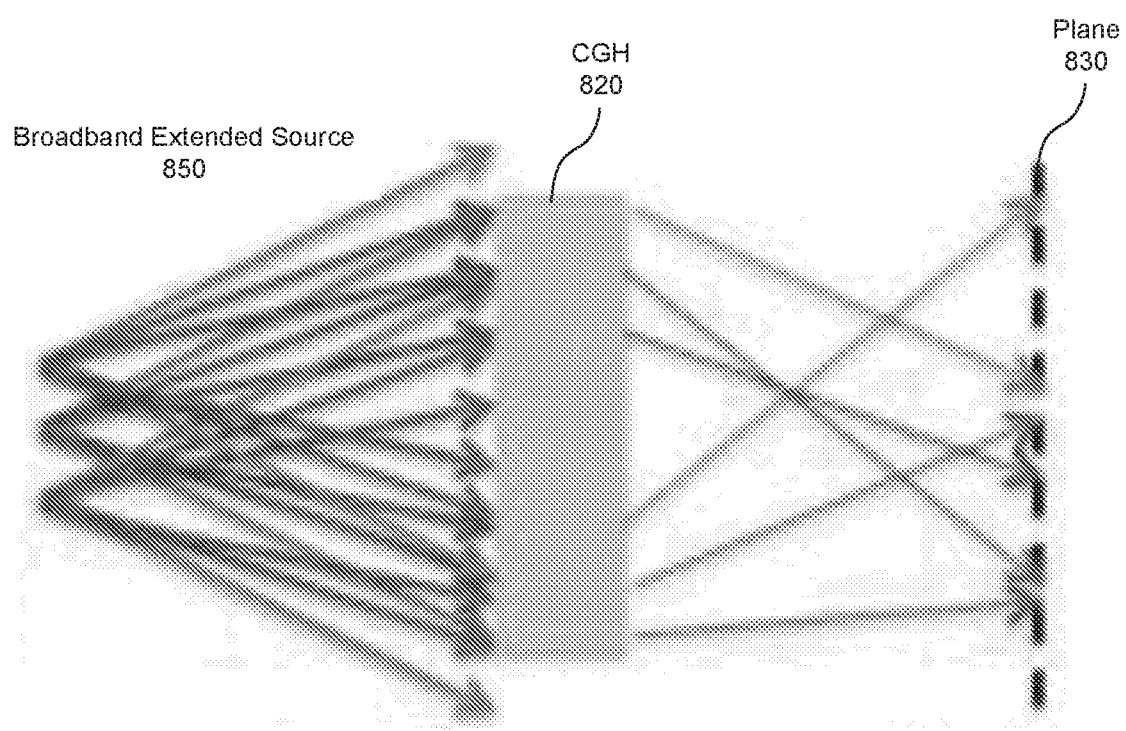

FIG. 8A depicts illumination conditions corresponding to broadband plane waves 810. The broadband plane waves 810 depict red, green and blue (RGB) colors and. The broadband plane waves form a CGH 820 on a plane 830. FIG. 8B depicts a broadband point source that can be formed by broadband spherical waves 840. FIG. 8C depicts multiple broadband point sources representing a broadband extended source 850. For example, the broadband extended source 850 can be generated using an array of LEDs for flash illumination of the CGH 820. The impact of an extended source is complex and is summarized in a simplified illustration in FIG. 8C. The broadband extended source 850 can be modeled as a linear combination of point sources, where each point is mutually incoherent and broadband. Therefore, each point results in an image that is shifted depending upon the location of the point source relative to the optical axis of the CGH 820 as shown in FIG. 8A. The image formed by each point can be sharp as indicated later in FIG. 10. However, when all these images are added up in intensity, the final CGH image becomes blurred as shown in FIG. 9B. The optics model can be extended to account for this effect. The amount of blurring is highly dependent upon the magnification of the image formed by the CGH 820. Then, the design algorithm will be able to account for this blur and design efficient CGHs that can still form easily recognizable images.

Figure 9A:
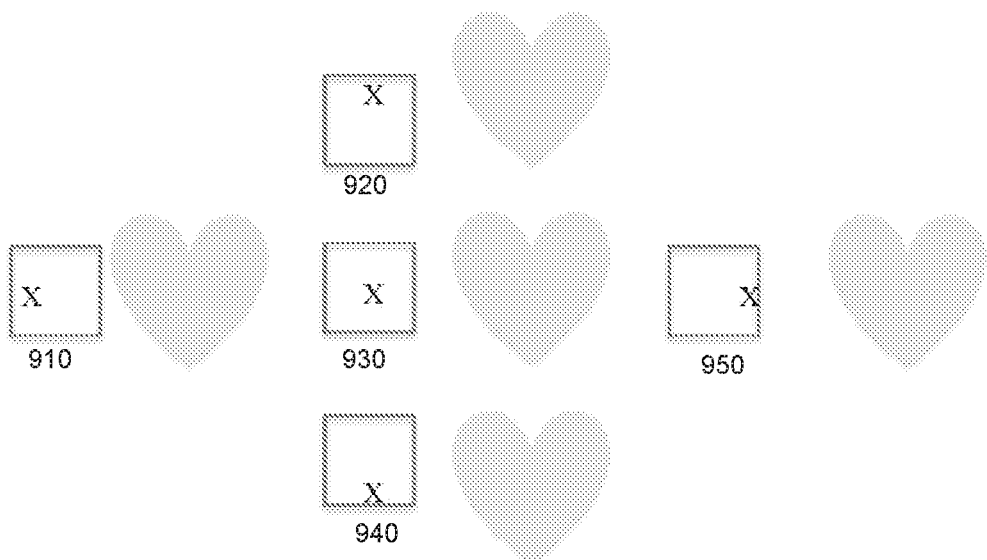
FIGS. 9A-B illustrate an impact of an extended-source illumination on the image formed by a CGH in accordance with an embodiment of the present invention.
Figure 9B:
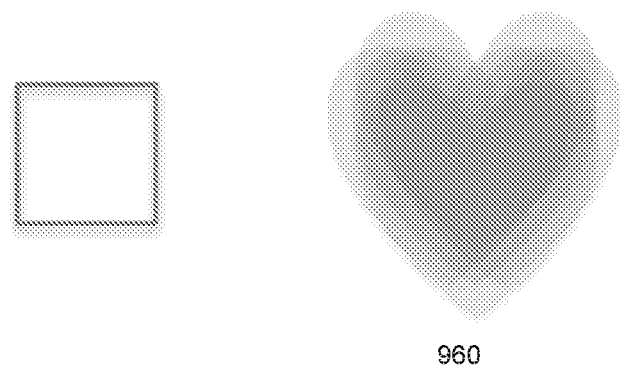
Figure 10:
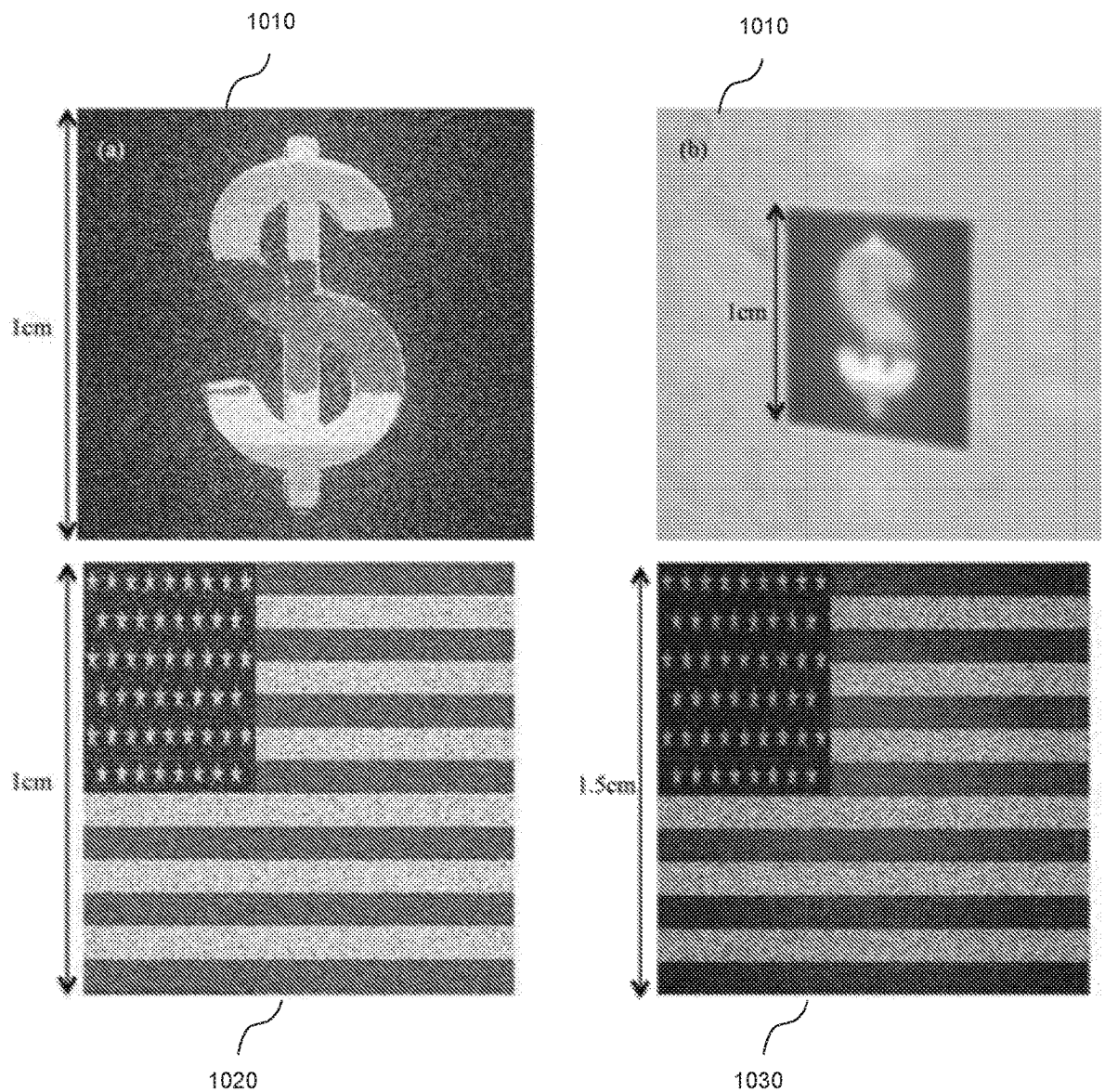
FIG. 10 illustrate preliminary results of holographic projections in accordance with an embodiment of the present invention.

FIGS. 9A-B depict an impact of an extended-source illumination on the image formed by a CGH. FIG. 9A depicts points 910, 920, 930, 940, and 950 that are each points of an extended source that forms a sharp image. Points 910, 920, 930, 940, and 950 each represent an image of a heart. FIG. 9B depicts a final image 960. When the points 910, 920, 930, 940, and 950 are added up in intensity, the final image 960 is blurred. As a general guideline, depending upon the specific requirements, the figure of merit can be first defined. For example, diffraction efficiency averaged over all the desired wavelengths (color channels). Then, a nonlinear optimization method (such as direct-binary search) can be applied to maximize this figure of merit. The figure of merit can be the discrepancy between the projected images and the corresponding desired images. In this case, the figure of merit is minimized. Generally, the figure of merit can be any combination of multiple functions as well. Two different holograms with plane wave input were designed and one of them (dollar sign) was experimentally verified as illustrated in FIG. 10. A third hologram was designed that projects an image of the Nation's Flag when illuminated by a point source and the simulated image is shown in FIG. 10. One example optimization method is described in U.S. Patent Application Publication No. US-2012-0266937-A1 which is incorporated herein by reference.

FIG. 10 depicts preliminary results of CGHs. Image 1010 is a simulated image of hologram designed using broadband plane waves (zi=375 mm). Image 1020 is an experimental image on a white screen captured using a mobile phone camera of the hologram in image 1010 showing good agreement with simulation. Image 1030 is a simulated image of another hologram designed using broadband plane waves (zi=750 mm). Image 1040 is a simulated image of a hologram designed using a single broadband point source (zi=450 mm, zs=300 mm). In all cases, the minimum feature size of the hologram was 20 μm.

Figure 11A:
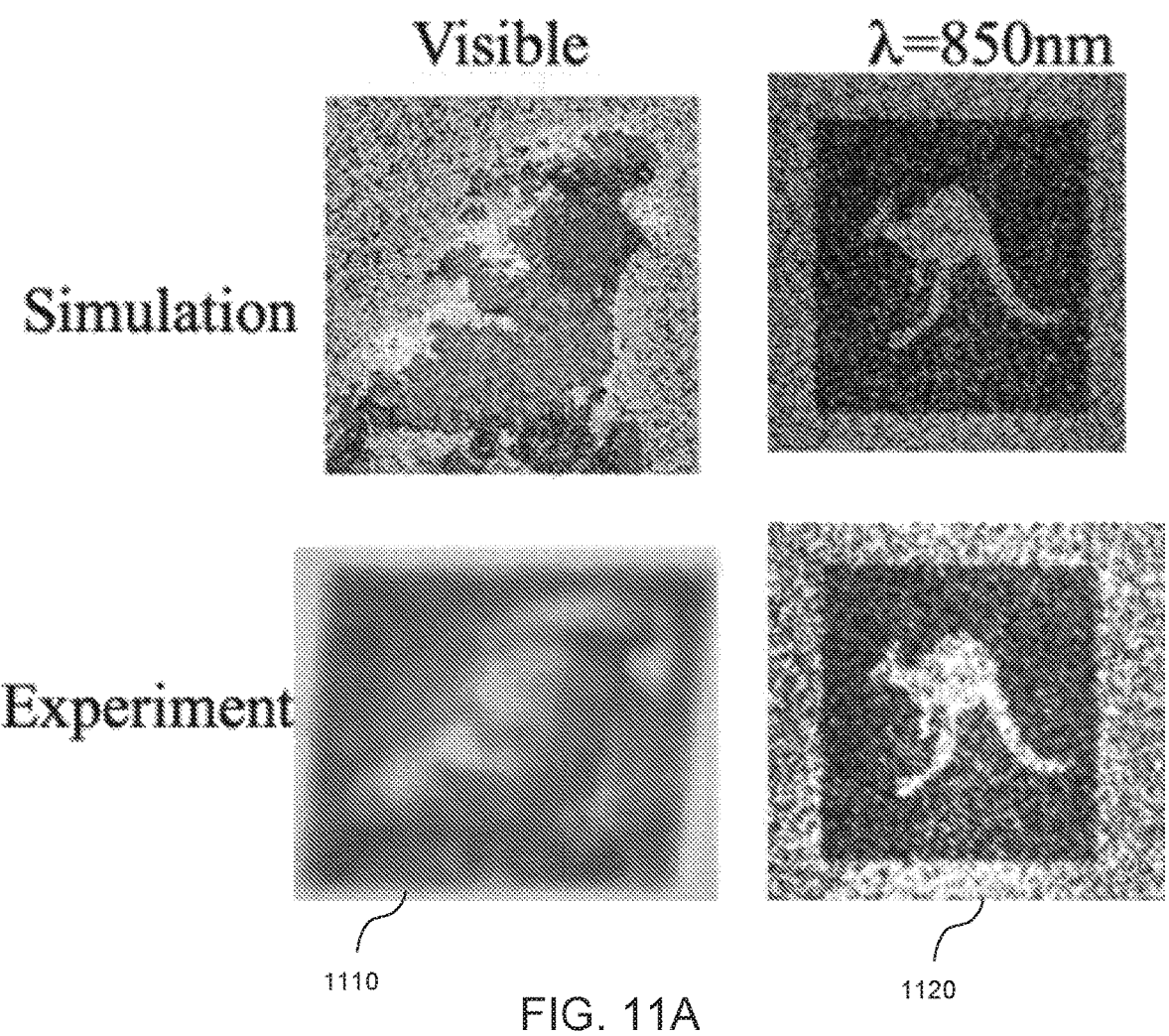
FIG. 11A illustrates a hologram with visible and invisible (λ=850 nm) images in accordance with an embodiment of the present invention.

Incorporation of covert images along with overt images are described below. It is further shown that overt images can be incorporated into the designs while still maintaining the colorful original image. This capability was demonstrated using broadband plane waves and experimentally verified as illustrated in FIG. 11A. The overt image was created by illuminating the device using a NIR laser at λ=850 nm. The overt image was captured using a conventional monochrome CMOS (Si) sensor. Such 2-level anti-counterfeiting device could be very useful for secure documents, where an overt image is sufficient for public usage, while the covert image could be used by authorities for additional verification. Note that image verification can be easily achieved using machine vision at high volume if needed. Also, note that covert images can also be obtained by choosing a different polarization or angle of incidence or size of the extended source or the location of the source (in this example, a different wavelength was chosen).

FIG. 11A depicts a hologram with a visible image 1110 and an invisible image 1120 (λ=850 nm). A single device is able to project two or more types of images. The NIR image was captured on a monochrome CMOS sensor.

In one example, images can be formed in the near-, quasi-near or far-fields. The distance between the image and the CGH can be varied from near, quasi-near or far field, where the terms near, or far refer to distance relative to the wavelength of light used. The computational methods for the design change in each case. For example, for the far field, one can use Fraunhofer diffraction theory, which is easily implemented as a Fourier transform. For the quasi-near case, one has to use either paraxial or non-paraxial methods such as the Fresnel-Kirchoff diffraction theory. For the near-case, one has to use more complex methods of solving Maxwell's equations such as finite-element-time domain methods.

Figure 11B:
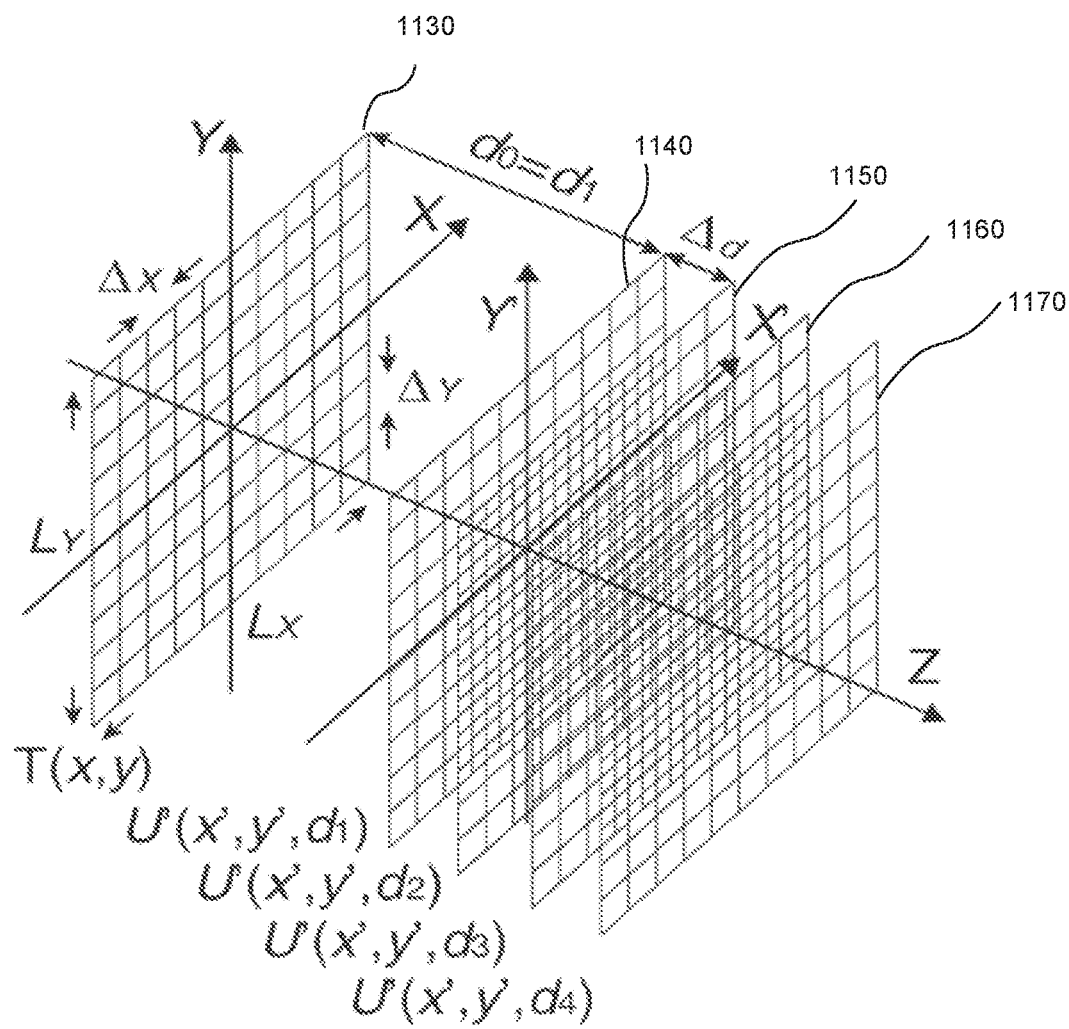
FIG. 11B is a schematic of extension of the invention to dynamic 3D images using phase spatial-light modulators.
Figure 11C:
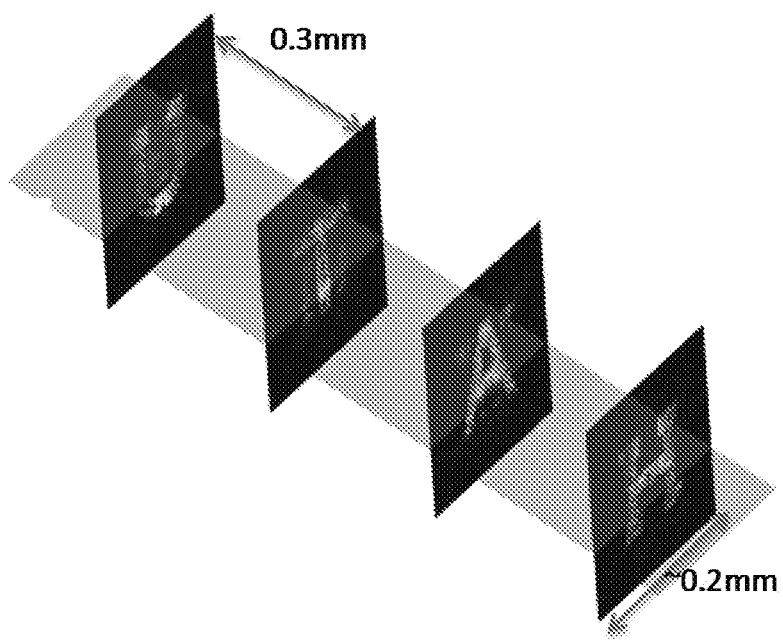
FIG. 11C is an experimental implementation of the 3D approach described more generally by FIG. 11B.

In one example, video images can be possible with spatial-light modulators. Although the description has largely been for static images, video images can also be achieved in all of the above by replacing the CGH (or flat lens) with a device that can change the phase distribution of light in a programmable manner such as a spatial-light modulator. One example of this approach is shown in FIGS. 11B-C. FIG. 11B depicts plane 1130 which is a phase spatial-light-modulator (PLSM) and planes 114, 1150, 1160, and 1170 which depict 2D image slices of a 3D volume. Compared to previous approaches, here the calculated phase pattern (which is imparted on the SLM) enables the creation of images in multiple planes (3D) and/or multiple colors (broadband) with high efficiency. This was not possible with conventional SLM-based holograms, where multiple colors or multiple planes required multiple SLM patterns (usually time multiplexed and therefore, slow). The results are experimentally demonstrated and shown in the images of FIG. 11C.

In one example, multi-level diffractive microstructures can enable broadband, on-axis transmissive holograms that can project complex full-color images, which are invariant to viewing angle. Compared to alternatives like metaholograms, diffractive holograms utilize much larger minimum features (>10 µm), much smaller aspect ratios (<0.2) and thereby, can be fabricated in a single lithography step over relatively large areas (>30 mm×30 mm). Metamaterials, on the other hand, require very high aspect ratios, making them extremely hard to manufacture, especially for areas larger than about 0.5 mm×0.5 mm. Holograms that encode various full-color images have been designed, fabricated and characterized. The devices demonstrate absolute transmission efficiencies of >86% across the visible spectrum from 405 nm to 633 nm (peak value of about 92%), and excellent color fidelity. Furthermore, these devices do not exhibit polarization dependence. Finally, the devices exhibit negligible absorption and are phase-only holograms with high diffraction efficiency.

The word, hologram originates from the Greek word, holos, which means whole. In general, the whole refers to the ability to control phase and amplitude of a wavefront to create a desired intensity image projection. In conventional holography, this is achieved via the interference between two coherent beams, one containing the information about the scene and another a reference beam. Digital holograms and computer-generated holograms have also been used extensively to achieve the same effect either via spatial-light modulators or using surface-relief structures. Lipmann photographs is a class of color holograms, where broadband interference fringes are recorded in a special photopolymer. However, their efficiency and field of view are highly limited due to the underlying Bragg diffraction. It is well known that multi-level diffractive optics (also referred to as kinoforms) can achieve very high efficiencies at a single wavelength. However, extension to full color computer-generated holograms is challenging and typically requires one device for each color. In addition, such surface-relief devices required multi-step lithographic processes, exhibited relatively low diffraction efficiencies and required coherent illumination. Metasurfaces, which can be defined as 2D photonic devices whose unit cells are comprised of sub-wavelength structures, have recently been applied to holography. These devices can engineer the amplitude, phase and polarization of light. A functional difference between conventional holograms and metasurfaces is the fact that metasurfaces can manipulate vector properties of the electromagnetic wave, namely polarization. If one is interested in only the scalar properties of light, such as intensity images, then metasurfaces are not required. In fact, metasurface-based holograms require very complex fabrication due to the subwavelength constituent features. Furthermore, they generally suffer from polarization dependence and relatively small operating bandwidths. Numerical studies of broadband transmissive holograms with peak efficiency greater than 90% have previously been described that do not share any of the disadvantages of metasurfaces. Here, high-efficiency, on-axis, transparent, full-color holograms are experimentally demonstrated using such multi-level diffractive optics. Broadband diffractive optical elements using multi-level super-wavelength features have been applied for spectrum-splitting and concentration in photovoltaics, and for super-achromatic cylindrical lenses. The application of this concept is extended to broadband computer-generated holography by designing, fabricating and characterizing a variety of holograms. It is demonstrated that average transmission efficiencies of over 86% can be achieved experimentally for the visible spectrum (405 nm to 633 nm). Note that transmission efficiency is the figure of merit used to characterize holograms based on metasurfaces. Furthermore, complex image projections with large viewing angles such as color photographs can be achieved. The devices utilize minimum feature size of 10 µm or larger and can be readily manufactured using micro-imprinting or embossing techniques, potentially over large areas, if desired.

Figure 12A:
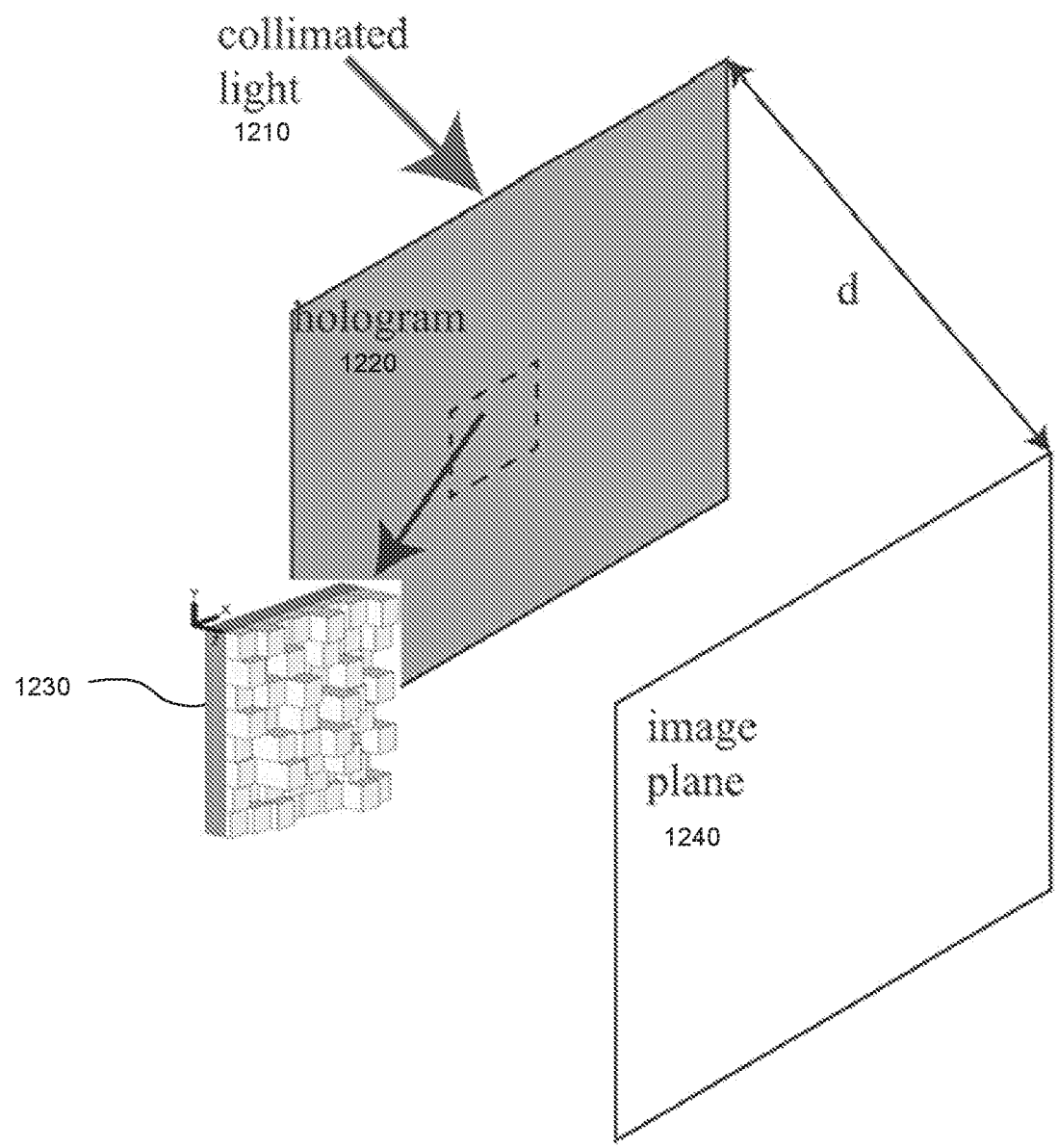
FIG. 12A illustrates a schematic of hologram in accordance with an embodiment of the present invention.
Figure 12B:
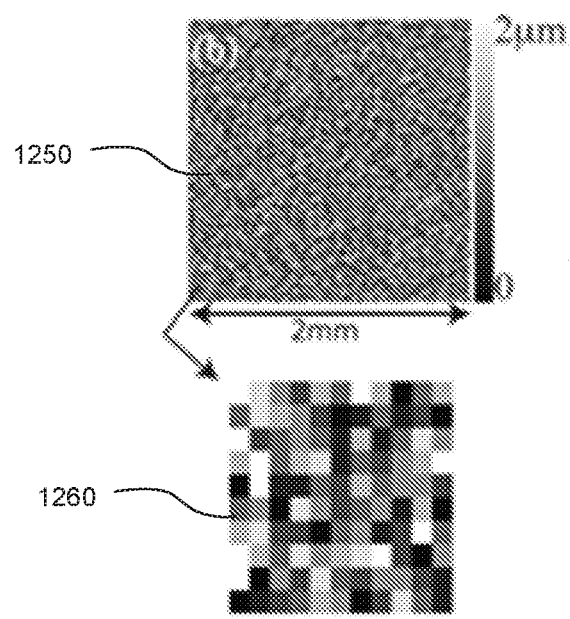
FIG. 12B illustrates a designed height map of a color-encoded hologram in accordance with an embodiment of the present invention.
Figure 12C:
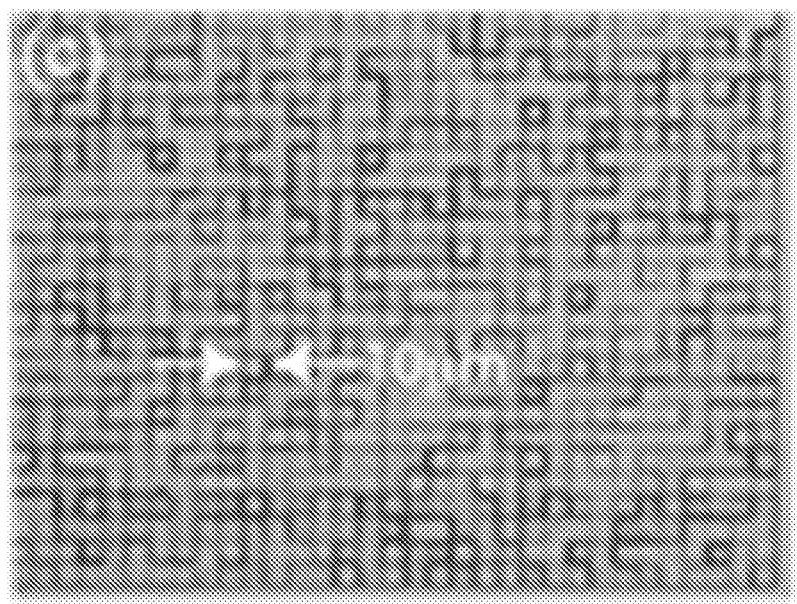
FIG. 12C illustrates magnified optical micrograph of a small portion of the device in accordance with another embodiment of the present invention.
Figure 12D:
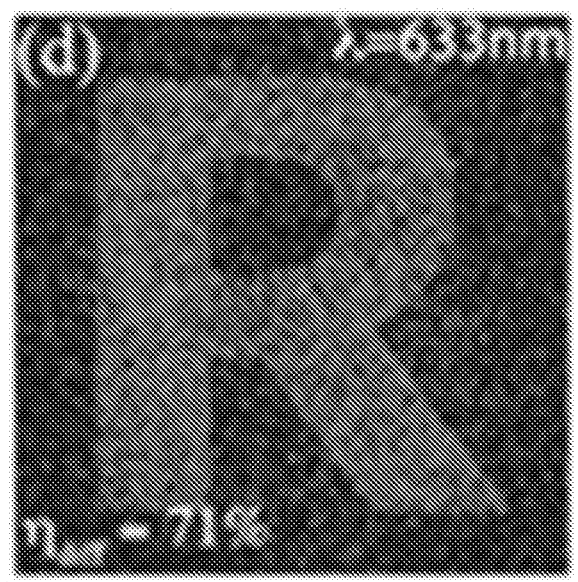
FIGS. 12D-F illustrates simulated images in accordance with an embodiment of the present invention.
Figure 12E:
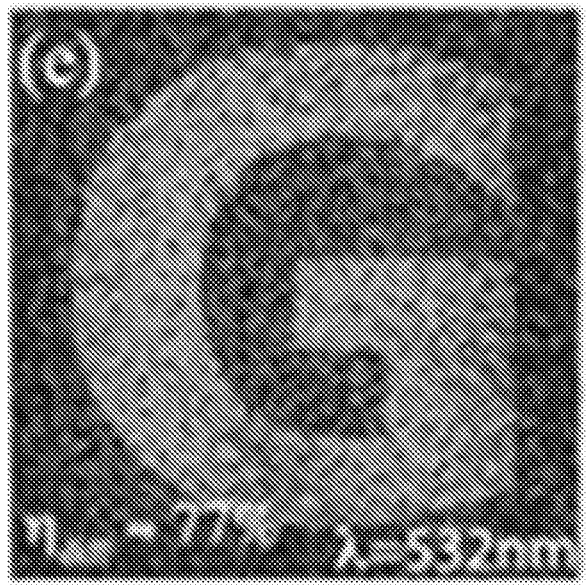
Figure 12F:
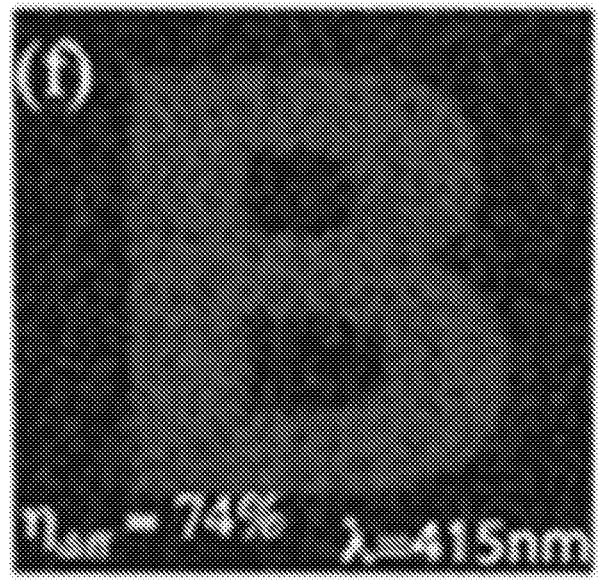
Figure 12G:
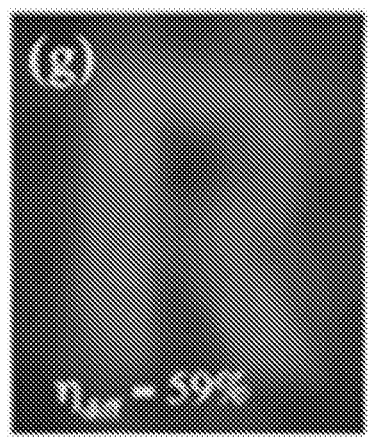
FIGS. 12G-I illustrates experimental images reflecting of a white opaque screen in accordance with an embodiment of the present invention.
Figure 12H:
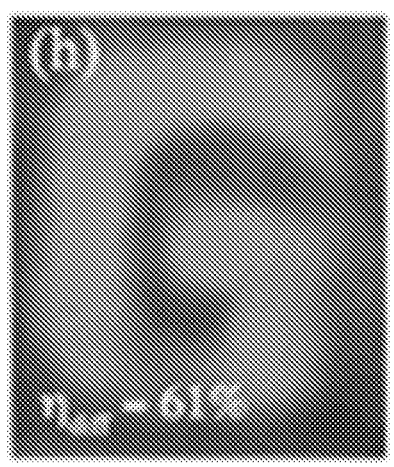
Figure 12I:
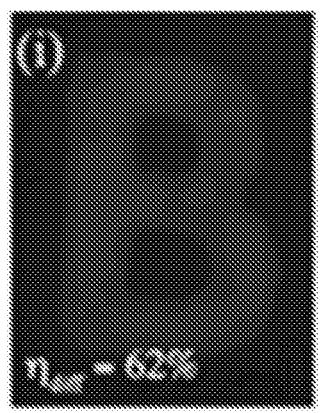

FIG. 12A depicts a schematic of a hologram. Collimated light 1210 impinges upon a planar lens 1230 that is part of a hologram 1220. A holographic image is then formed on the image plane 1240. In FIG. 12B a designed height map of color-encoded hologram is depicted in image 1250. Image 1260 depicts a magnified view of 11×10 pixels of bottom left corner of image 1250. In FIG. 12C a magnified optical micrograph of a small portion of the device is depicted. FIGS. 12D-F depict simulated images. FIG. 12D depicts an image with a wavelength of $\lambda$=633 nm. FIG. 12E depicts an image with a wavelength of $\lambda$=532 nm. FIG. 12F depicts an image with a wavelength of $\lambda$=415 nm. FIGS. 12G-I depict corresponding experimental images reflecting of a white opaque screen corresponding respectively to FIGS. 12D-F. The simulated and measured diffraction efficiencies are noted in each image.

The target images for the color-encoded hologram are the letters "R", "G" and "B" at $\lambda$=633 nm, 532 nm and 405 nm, respectively. The designed pixel-height distribution is shown in FIG. 12B, while the optical micrograph of a small portion of the device is shown in FIG. 12C. The pixel heights of the fabricated device was measured and estimated the average error as only 46 nm (see section 5 of the supplementary information). Although the blue wavelength used for design was 405 nm, 415 was used nm during the experiments, since that was the lowest wavelength with sufficient power accessible with the super-continuum source. Furthermore, the quantum efficiency of the image sensor is low at 405 nm. The simulated image at 405 nm is included in the supplementary information. The simulated images at $\lambda$=633 nm, 532 nm and 415 nm are shown in FIG. 12D-F, respectively. Photographs of the corresponding images reflected off an opaque white screen are shown in FIG. 12G-I. The illumination bandwidth in each case was 10 nm. Corresponding images were also captured directly onto an image sensor and the diffraction efficiencies were computed from these images. There is good qualitative agreement between the measured and simulated images. The measured average diffraction efficiencies are lower than expected (61% in experiments vs 74% in simulations). The discrepancy can be partly attributed to imperfect collimation of the incident light, which also accounts for blurring of the image edges compared to the simulations.

Each hologram is comprised of square pixels as shown in FIG. 12A. Each pixel has a width, $\Delta$ and the heights of the pixels can vary from 0 to a maximum height of H in steps of $\Delta h$. When illuminated with appropriate wavelengths of light, the hologram produces an image at a certain distance, d. The pixel heights are selected using an optimization procedure based on the target design as described below. In this example, 3 different target images were used: a color-encoded image, where each color produces a different image (overlapping in space), a Macbeth color-chart to showcase the range of colors, and finally, a color photograph of an outdoor scene. In the first design, the minimum feature size is 10 μm and maximum pixel height is 2 μm. In the 2nd design, the minimum feature size is 20 μm and the maximum pixel height is 2 μm, while for the 3rd design, the minimum feature size is 20 μm and the maximum pixel height is 2.4. The large pixel widths ensure that these device are polarization independent. In all cases, the devices were designed for three discrete wavelengths, 405 nm, 532 nm and 633 nm. All the devices were designed using periodic boundary conditions. Other geometric and design parameters are fully described in the supplementary information.

The holograms were designed using nonlinear optimization with the objective of maximizing a figure of a merit defined in Equation 1:

$$\eta = \frac{1}{N} \sum_\lambda \frac{\sum_m \sum_n I_T^{(\lambda)} |U(p_{m,n})|^2}{P_{in}^{(\lambda)}} \quad \text{Equation 1}$$

where, $\eta$ is the wavelength averaged diffraction efficiency, $\lambda$ is the design wavelength, N is the number of design wavelengths, $I_T^{(\lambda)}$ is the target image pattern at wavelength $\lambda$, $U(p_{m,n})$ is the complex amplitude at the reconstruction plane diffracted by the hologram with height profile distribution $p_{m,n}$, m and n are the pixel indices, and $P_{in}^{(\lambda)}$ is the input power at wavelength $\lambda$. The objective of the optimization is to determine a height profile $(p_{m,n})$ so that the wavelength averaged diffraction efficiency is maximized.

Additionally, other metrics can be used for maximizing or optimizing the design of the hologram. The other metrics can include: maximizing diffraction efficiency over all wavelengths, minimizing standard deviation within the image across all wavelengths of interest, maximizing momentum transfer due to radiation pressure or gradient forces, minimizing aberrations in the point-spread function of flat lenses across the field of view and for all wavelengths, maximizing contrast of the projected images, and weighted linear or nonlinear combinations of all the previous metrics. These other metrics can also be applied for multiple diffractive surfaces in parallel. For example when multiple flat lenses are used in an imaging system).

The holograms were fabricated using single-step gray-scale lithography on a glass wafer spin coated with positive photoresist. In order to emulate the periodic boundary conditions used during design, the same design was repeated three times in the X direction and three times in the Y direction during fabrication. Details of the fabrication process are described in the supplementary information. For characterization, each hologram was illuminated by a collimated beam from a supercontinuum source with a tunable bandpass filter or from a white collimated backlight. The projected intensity images were captured either onto an image sensor or projected onto a screen and photographed. A white translucent screen was used to capture on-axis images in transmission, while an opaque white screen was used to capture off-axis images in reflection. Further details of the imaging setup and characterization procedure are described in section 3 of the supplementary information.

Figure 13A:
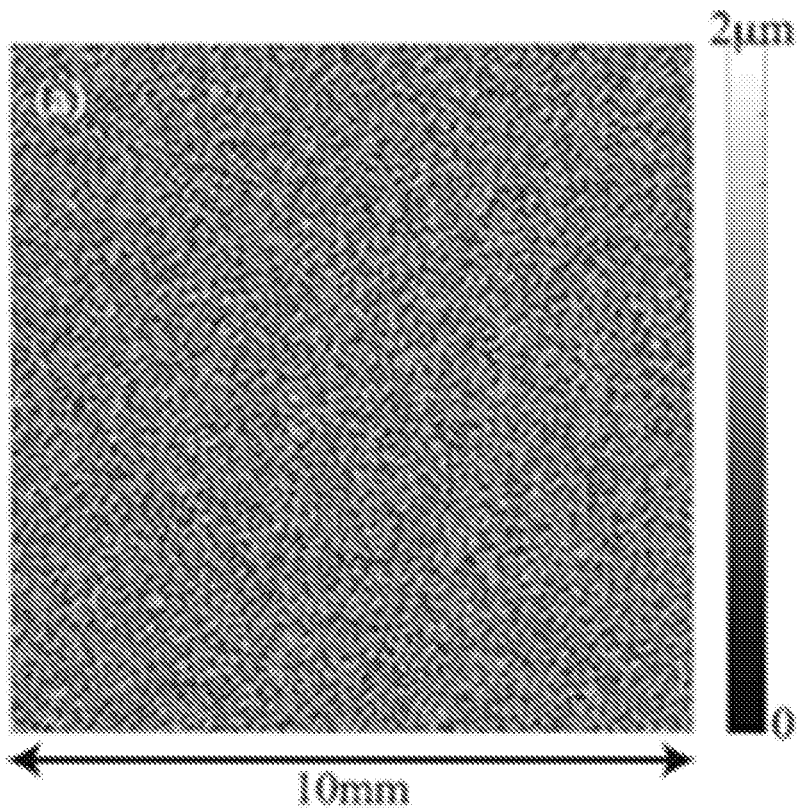
FIGS. 13A-F illustrates hologram encoding a Macbeth color chart in accordance with an embodiment of the present invention.
Figure 13B:
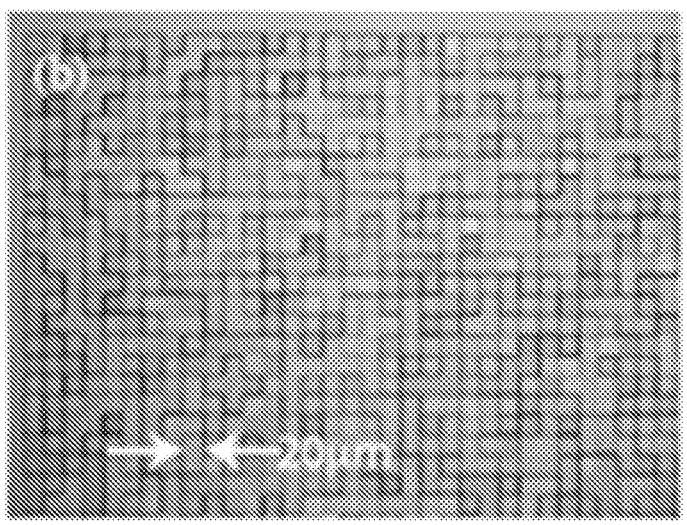
Figure 13C:
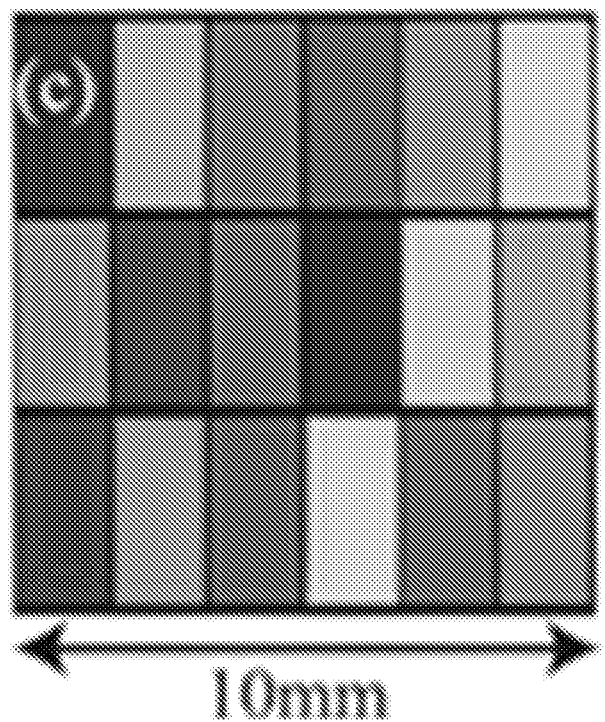
Figure 13D:
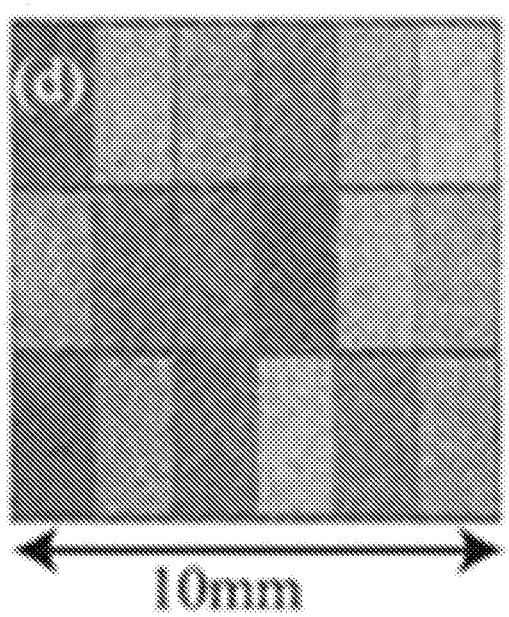
Figure 13E:
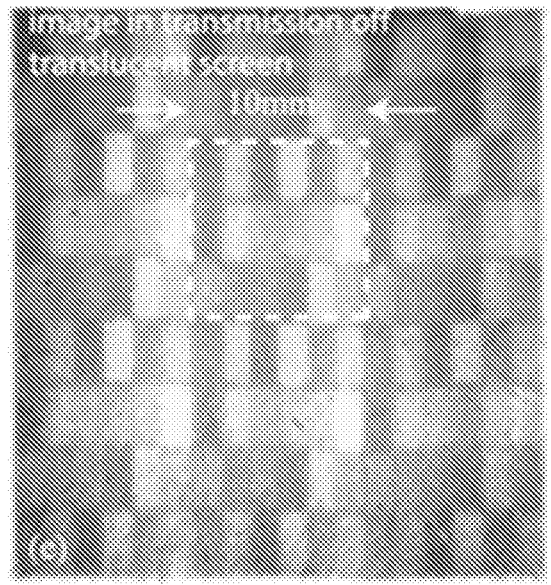
Figure 13F:
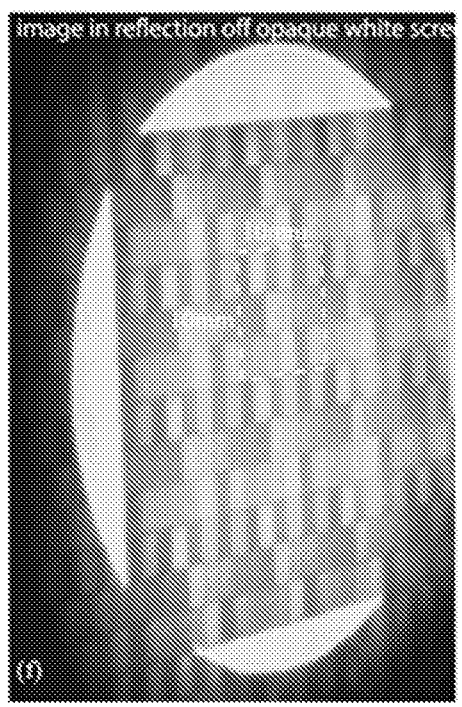

FIGS. 13A-F depict hologram encoding a Macbeth color chart. FIG. 13A depicts a design height map of the hologram. FIG. 13B depicts an optical micrograph of a portion of the hologram. FIG. 13C depicts a target image of the Macbeth chart. FIG. 13D depicts a simulated image created by the hologram, when it is illuminated by the design wavelengths. FIG. 13E depicts a photograph of the image on a white translucent screen taken in transmission at normal viewing angle. FIG. 13F depicts a photograph of the image reflected of a white opaque screen taken at an oblique viewing angle. Note that the color image does not change with viewing angle. Illumination is full white spectrum from super-continuum source for both FIGS. 13E and F.

The diffraction efficiency ($\eta_{diff}$) was calculated as the power inside the outline of the target image divided by the total power inside the aperture of the hologram (see equation 1). This metric was measured only for the simple images in the color-encoded described later. Details of the efficiency measurements are included in supplementary information.

The second device designed had a target image of a portion of the Macbeth color chart. The design pixel-height distribution is shown in FIG. 13A and an optical micrograph of a small portion of the fabricated device is shown in FIG. 13B. The target image, the simulated image and a photograph of the experimental image projected onto a translucent white screen are shown in FIG. 13C-E, respectively. The dashed white lines in FIG. 13E demarcate one period of the image. FIG. 13F shows the photograph of the image projected onto an opaque white screen. Note that the photograph was taken at an oblique viewing angle illustrating that the image quality is maintained for a large range of viewing angles. Full white spectrum from the super-continuum source was used as illumination in both cases. The simulated diffraction efficiencies (from equation 1) for this device were 64%, 53% and 65% at $\lambda$=633 nm, 532 nm and 405 nm, respectively. The color range of the Macbeth chart is reproduced reasonably well considering that the design was performed only for 3 discrete wavelengths. Using more wavelengths during design will increase the color-reproduction accuracy.

Figure 14A:
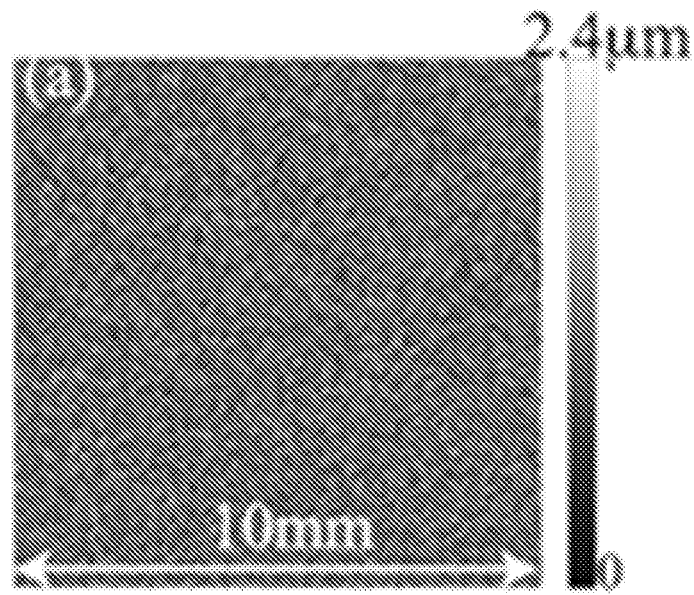
FIGS. 14A-G illustrates a hologram encoding a color photograph in accordance with an embodiment of the present invention.
Figure 14B:
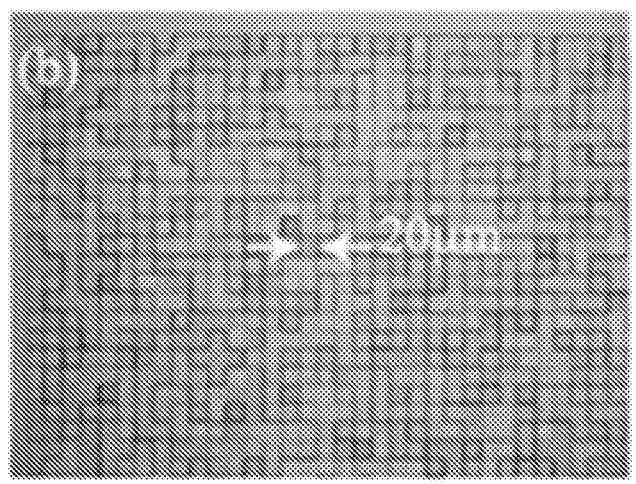
Figure 14C:
Figure 14D:
Figure 14E:
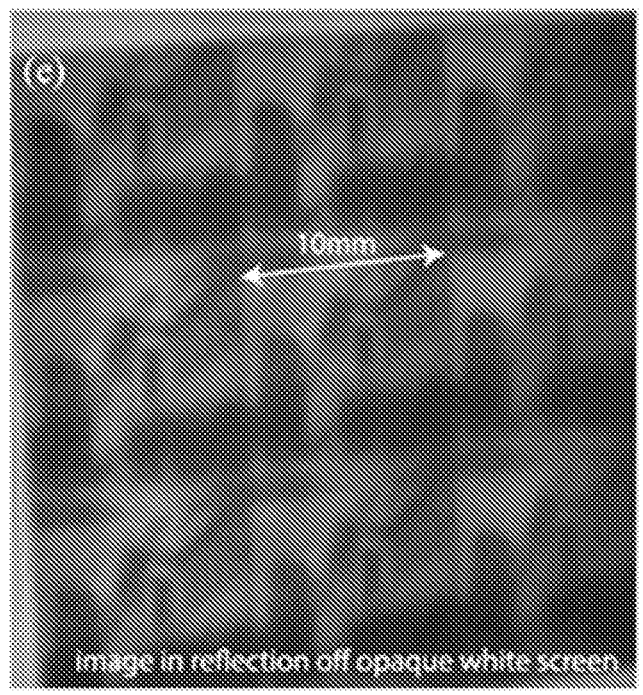
Figure 14F:
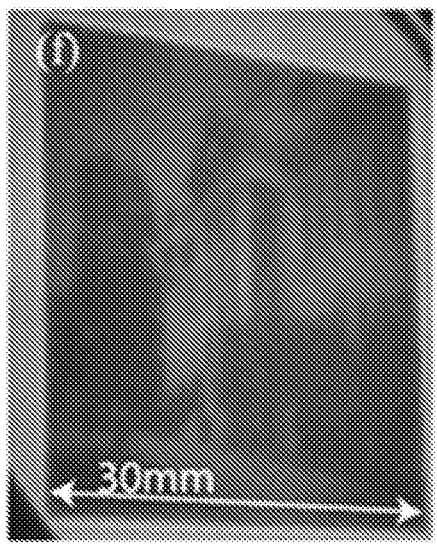
Figure 14G:
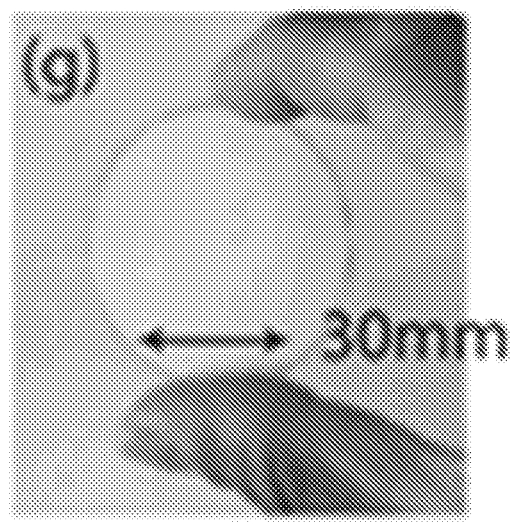

FIGS. 14A-G depict a hologram encoding a color photograph. FIG. 14A depicts a design height map of the hologram. FIG. 14B depicts an optical micrograph of a portion of the fabricated device. FIG. 14C depicts a target image corresponding to the color photograph. Image courtesy of the University of Utah. FIG. 14D depicts a simulated image created by the hologram, when it is illuminated by the design wavelengths. FIG. 14E depicts a photograph of the image reflected of a white opaque screen taken at a small oblique viewing angle. FIG. 14F depicts a photograph of image reflected of a white opaque screen for a single-period hologram containing 1500×1500 pixels in a single period. In both FIGS. E and F the hologram is illuminated by the full visible band. FIG. 14G depicts a photograph of single-period hologram. Its size is 30 mm×30 mm.

A third device can encode a color photograph and its pixel-height distribution. An optical micrograph of a portion of the fabricated device is shown in FIG. 14B. The simulated diffraction efficiencies were 77%, 85% and 86% for λ=633 nm, 532 nm and 405 nm, respectively. The target image, the simulated image and a photograph of 3×3 periods of the projected image reflected off an opaque white screen are shown in FIGS. 14C-E, respectively. Note that the photograph indicates good color reproduction even at an oblique viewing angle. In order to increase the resolution of the projected image, another device was also designed and fabricated containing 1500×1500 pixels. To reduce fabrication time, only one period of this device was fabricated and characterized. A photograph of the projected image reflecting off an opaque white screen is shown in FIG. 14F. A photograph of this single-period hologram is shown in FIG. 14G. This result coupled with the simulated image of a single-period hologram confirms that periodic boundary conditions are not a limitation of the design method. In all cases in FIG. 14, the devices were illuminated with the white collimated backlight. The transmission efficiency was measure of devices of the present technology. Note that transmission efficiency was used earlier as a figure of merit for metalens-based holograms. First, an aperture of the same size as one period of the hologram was placed directly in front of the hologram. The absolute transmission efficiency was defined as the ratio of the power transmitted through the hologram to that incident on the hologram. The relative transmission efficiency was also measured, which is defined as the ratio of the power transmitted through the hologram to that transmitted through an unpatterned region.

Figure 15:
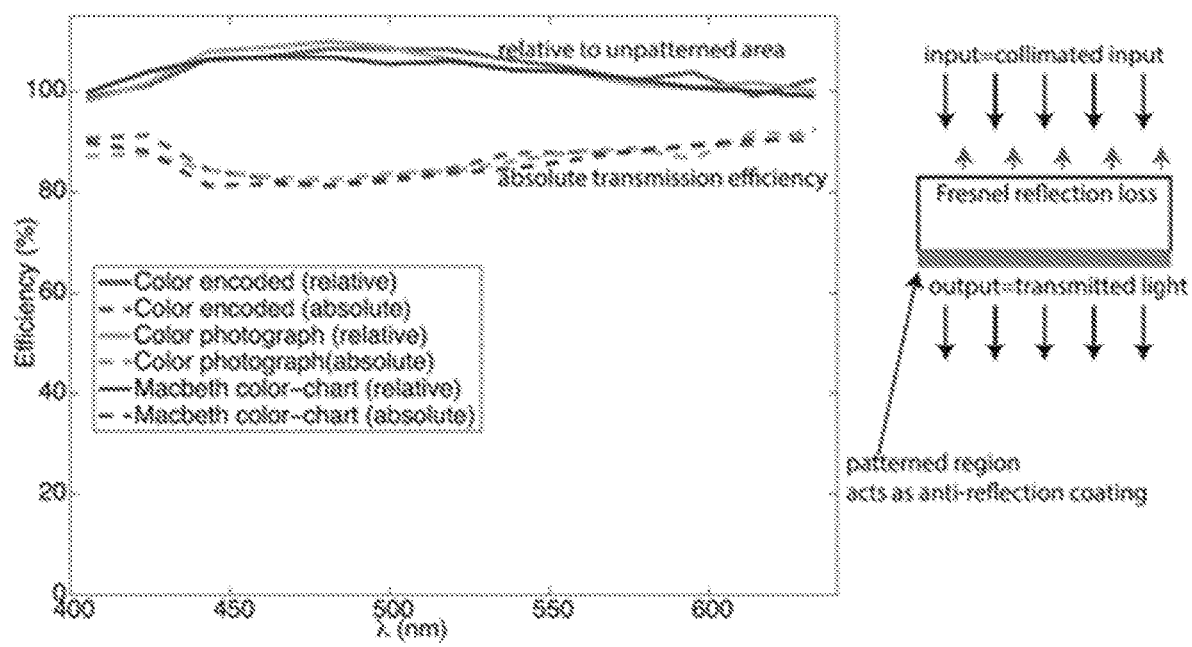
FIG. 15 illustrates measured transmission efficiency as a function of wavelength for the three hologram designs in accordance with an embodiment of the present invention.

FIG. 15 depicts measured transmission efficiency as a function of wavelength for three hologram designs. The absolute transmission efficiencies are plotted using dashed lines, while the transmission efficiency relative to an unpatterned area is shown with solid lines. Right Inset shows how the patterned region reduces reflection losses, which allows for greater than 100% relative transmission.

The results, as a function of illumination wavelength are plotted in FIG. 15 (dashed lines show absolute values, while solid lines show relative values). The illumination was the super-continuum source coupled to a tunable filter. A bandwidth of 10 nm was used for each wavelength sample for the transmission-efficiency measurements. The average absolute transmission efficiencies (from 405 nm to 633 nm) are 87%, 87% and 86% for the color-encoded hologram, the photograph hologram and the Macbeth hologram, respectively. Some of the relative efficiencies are higher than 100% indicating that the hologram pattern acts as an anti-reflection coating (right inset in FIG. 15). It is useful to note that the absolute transmission efficiencies can be even higher by applying a properly designed anti-reflection coating on the unpatterned side of the hologram substrate. In conclusion, it is demonstrated that broadband transmissive holograms can be enabled by multi-level diffractive optics, which are much simpler to fabricate and offer polarization independence than when compared to alternatives such as those based upon metasurfaces. This is another example of an application where diffractive optics is sufficient when manipulating scalar properties of the electromagnetic field (intensity in this case). Multi-level diffractive optics can be readily manufactured at low cost via embossing techniques that have been used to create surface-relief-based Bragg holograms. However, unlike Bragg holograms, multi-level diffractive holograms can be transmissive and create images that are relatively invariant with viewing angle. It is noted that there has been significant progress in the design methods of color computer-generated holograms (CGHs) using techniques like depth division and space division to multiplex the images at different wavelengths. However, experimental demonstration of such devices often utilize spatial-light modulators and therefore are constrained by the associated space-bandwidth product. Furthermore, these require relatively narrowband sources such as lasers or light-emitting diodes. Broadband white sources have been used for certain color CGHs, however these suffer from significant chromatic aberrations especially at higher resolutions.

Figure 16:
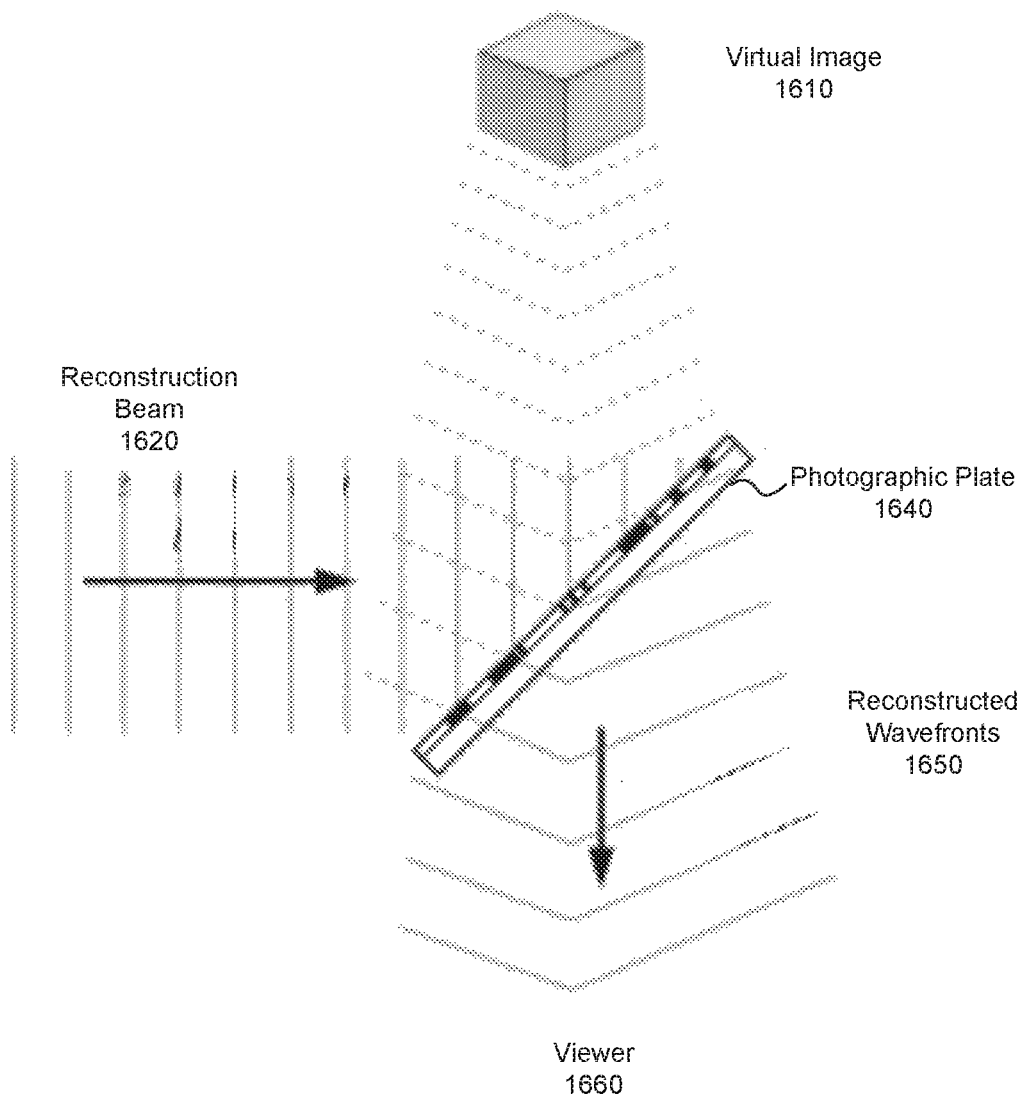
FIG. 16 illustrates a holographic projection in accordance with an embodiment of the present invention.

FIG. 16 depicts a holographic projection in accordance with the present technology. A virtual image 1610 can be described as a holographic image that is formed by light such as a reconstructed beam 1620 reflected off a photographic plate 1640 as reconstructed wavefronts 1650. The reconstructed wavefronts 1650 are then visible through a viewer 1660. The photographic plate can be diffractive optic of the present technology. Although FIG. 16 shows an off-axis (90 deg) configuration, one alternative embodiment is an on-axis configuration, where the viewer is directly facing the light source and the diffractive optic. Clearly, other off-axis angular configurations can also be utilized with these principles.

The design and geometric parameters of the holograms are described below. The holograms are pixelated in X and Y directions, height of each pixel is quantized into multiple levels. Different parameters have been used for the three hologram designs. These are summarized in Table 2. Table 2 describes design and geometric parameters of three hologram designs.

TABLE 2

| Hologram design | Color-encoded | Macbeth color-chart | Photograph (also referred to as Park Building) |
|---|---|---|---|
| Pixel size (μm) | 10 | 20 | 20 |
| Number of pixels | 201 × 201 | 500 × 500 | 500 × 500 |
| Physical size (mm × mm) | 2.01 × 2.01 | 10 × 10 | 10 × 10 |
| Maximum height (μm) | 2 | 7 | 2.4 |
| Number of grayscale levels | 8 | 64 | 88 |
| Propagation distance (mm) | 50 | 500 | 500 |
| Design wavelengths (nm) | 405, 532, 633 | 405, 532, 633 | 405, 532, 633 |
| Refractive index at design wavelengths | 1.6894, 1.6482, 1.6347 | 1.5894, 1.6482, 1.6347 | 1.6894, 1.6482, 1.6347 |

The simulated diffraction efficiencies for the three designs are summarized in Table 3 below. Table 3 describes simulated diffraction efficiencies.

TABLE 3

| Channel | Color-encoded | Macbeth color-chart | Photograph |
|---|---|---|---|
| Red(633) | 71.33 | 63.49 | 77.09 |
| Green(532) | 76.77 | 53.11 | 84.77 |
| Blue(405) | 74.63 | 65.24 | 86.30 |

Embodiments of fabrication are described as follows. Direct laser-write lithography was used to fabricate the holograms in a single lithography step using the grayscale mode. Shipley 1813 photoresist was spin coated on RCA cleaned 2" D263 glass wafers at 1000 rpm. The samples were then baked in an oven at 110 degree C. for 30 minutes. The hologram designs were written on the samples using Heidelberg Micro Pattern Generator 101 tool and developed in AZ 1:1 solution for 1 minute 30 seconds. A calibration step was performed on a separate sample (prepared with the same process conditions) before fabricating the holograms. The goal of calibration step was to determine the exposed depths at a particular gray scale level. Details of the calibration have been discussed elsewhere.

Figure 17:
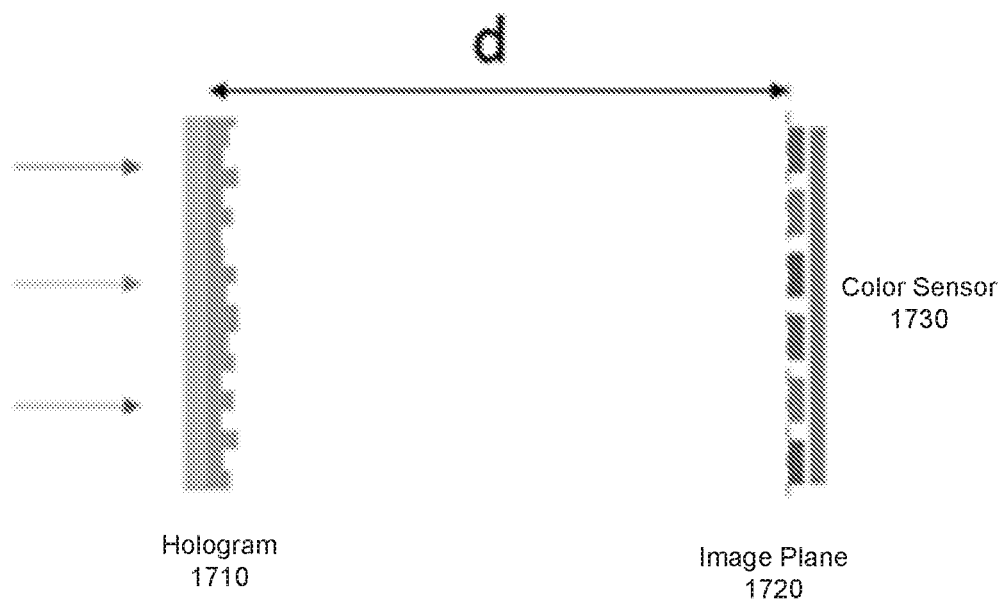
FIG. 17 illustrates schematics showing characterization of the hologram designs using a color sensor in accordance with an embodiment of the present invention.
Figure 18A:
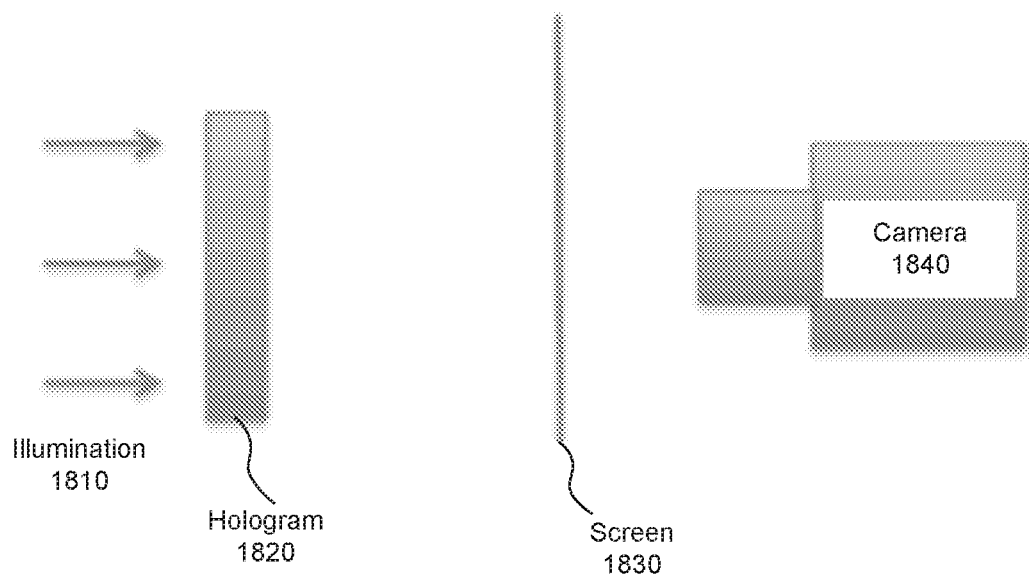
FIGS. 18A and B illustrates schematics showing two methods for characterizing the image projected by the hologram in accordance with an embodiment of the present invention.
Figure 18B:
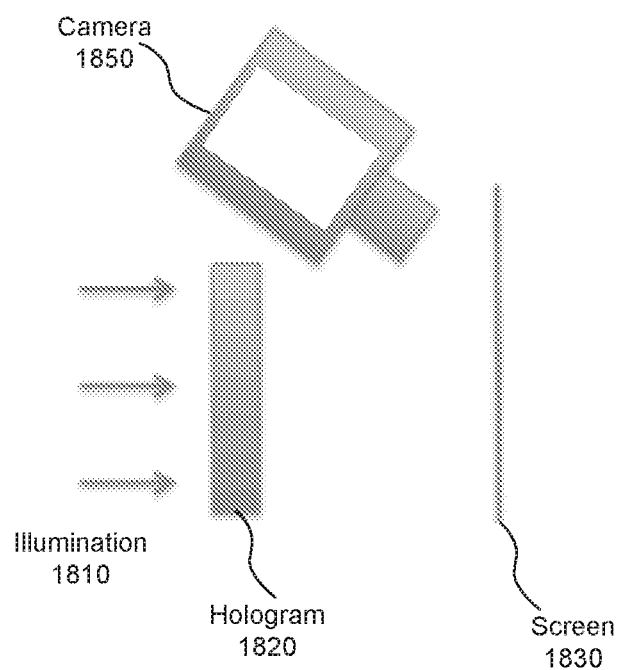

FIGS. 17, 18A and 18B depict three different methods. A color sensor 1730 was placed at an image plane 1720 which can be described as a reconstruction plane of the hologram 1710 to record the image. FIG. 18A depicts light in the form of illumination 1810 projected at a hologram 1820. The resulting image was then projected onto a screen 1830 such as a translucent white screen. The resulting image was then photographed from behind the screen 1830 using a camera 1840. The camera 1840 was positioned on-axis as illustrated in FIG. 18A. FIG. 18B depicts light in the form of illumination 1810 projected at a hologram 1820. The resulting image was then projected onto a screen 1830 such as a translucent white screen. The resulting image was then photographed by a camera 1850. Camera 1850 is depicted in FIG. 18B as photographing an image reflected off the screen 1830. Different illumination sources for illumination 1810 can be used. For example, a collimated and expanded beam from SuperK VARIA filter which in turns connected to SuperK EXTREME EXW-6 source can be used or a white collimated backlight.

Figure 22:
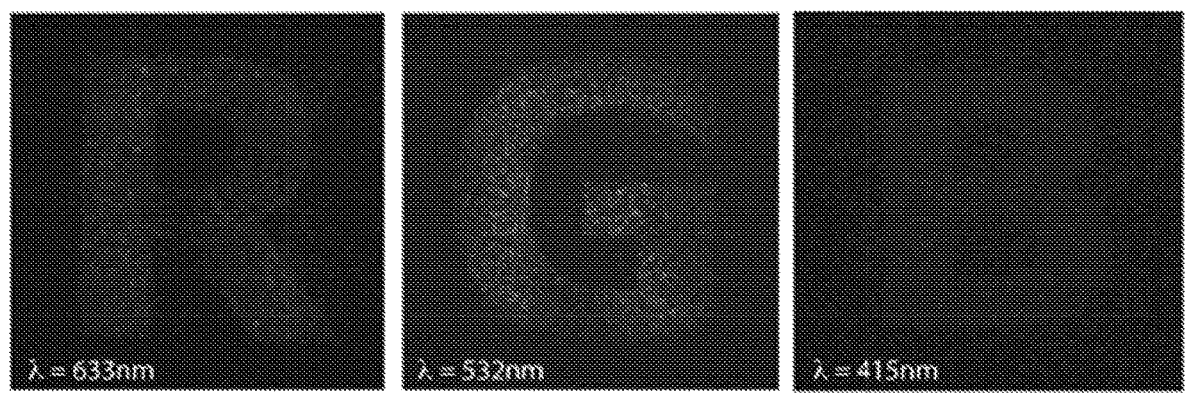
FIG. 22 which illustrates images captured on color sensor for the color-encoded hologram in accordance with an embodiment of the present invention.
Figure 23:
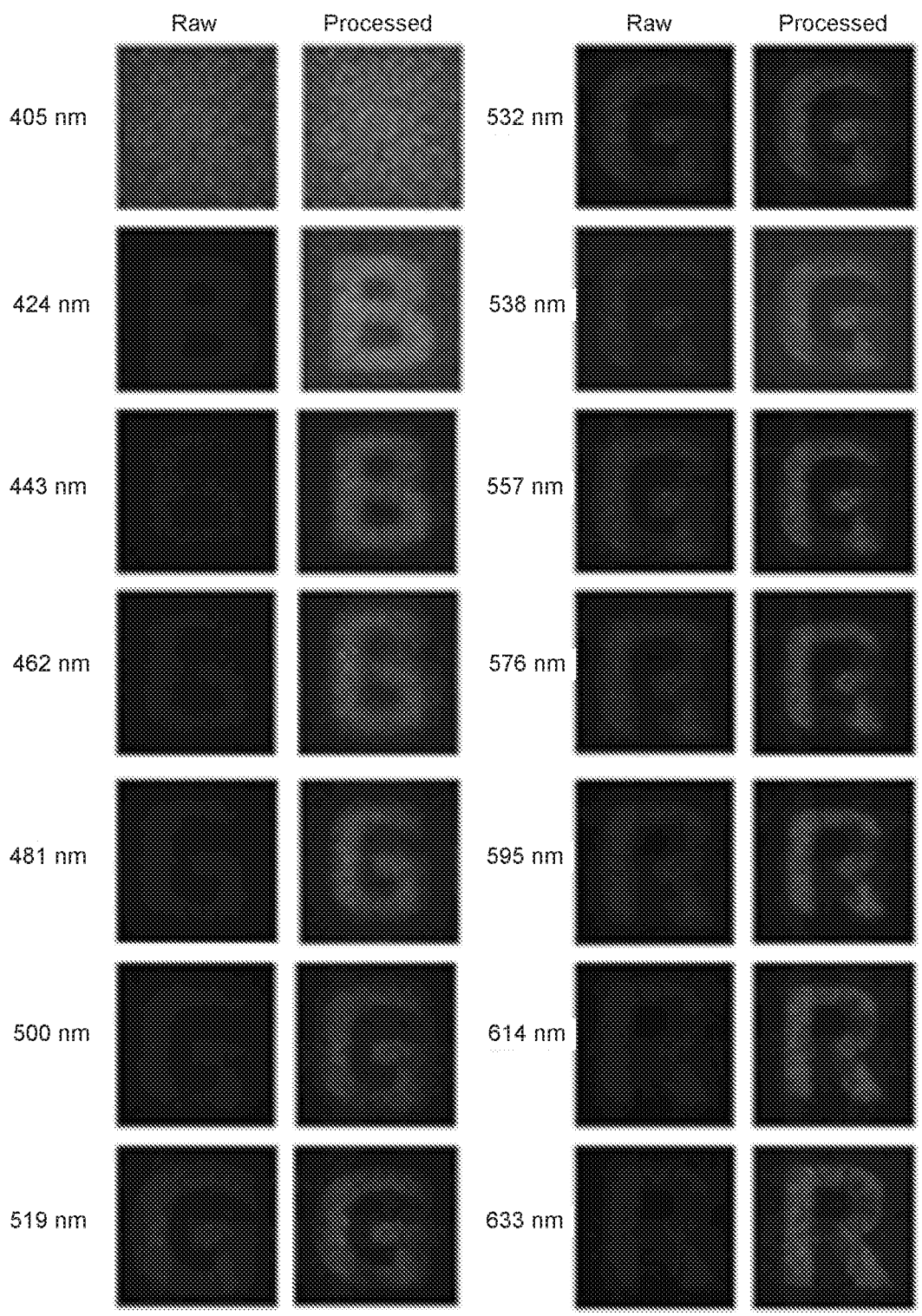
FIG. 23 illustrates experimental images of the color-encoded hologram at different wavelengths in accordance with an embodiment of the present invention.

In the case of the color-encoded hologram, a device can be illuminated with the three wavelengths from the SuperK (415 nm, 532 nm, 633 nm with 10 nm bandwidth) one by one and corresponding reconstructed images may be captured with the setup shown in FIG. 17. Images resulting from this example setup are are shown in FIGS. 22 and 23. These images were also projected onto a white screen and photographed using the setup shown in FIG. 18B. These images were shown in FIGS. 12G-I. Note that 415 nm was used instead of 405 nm because of the low quantum efficiency of the colors sensor at this wavelength and due to the low power from the source at 405 nm. In case of the Macbeth color-chart and the photograph holograms, the reconstructed images were captured using the setups shown in FIG. 18A and B. The image shown in FIG. 13E was taken using the setup shown in FIG. 18A while those in FIGS. 13F, 14E and 14F were taken with the setup shown in FIG. 18B. The illumination source was SuperK (405 nm-633 nm) for the images in FIG. 13E and 13F and collimated white backlight for those FIGS. 14E and 14F. More details about the source spectra are described in the next section.

Figure 19:
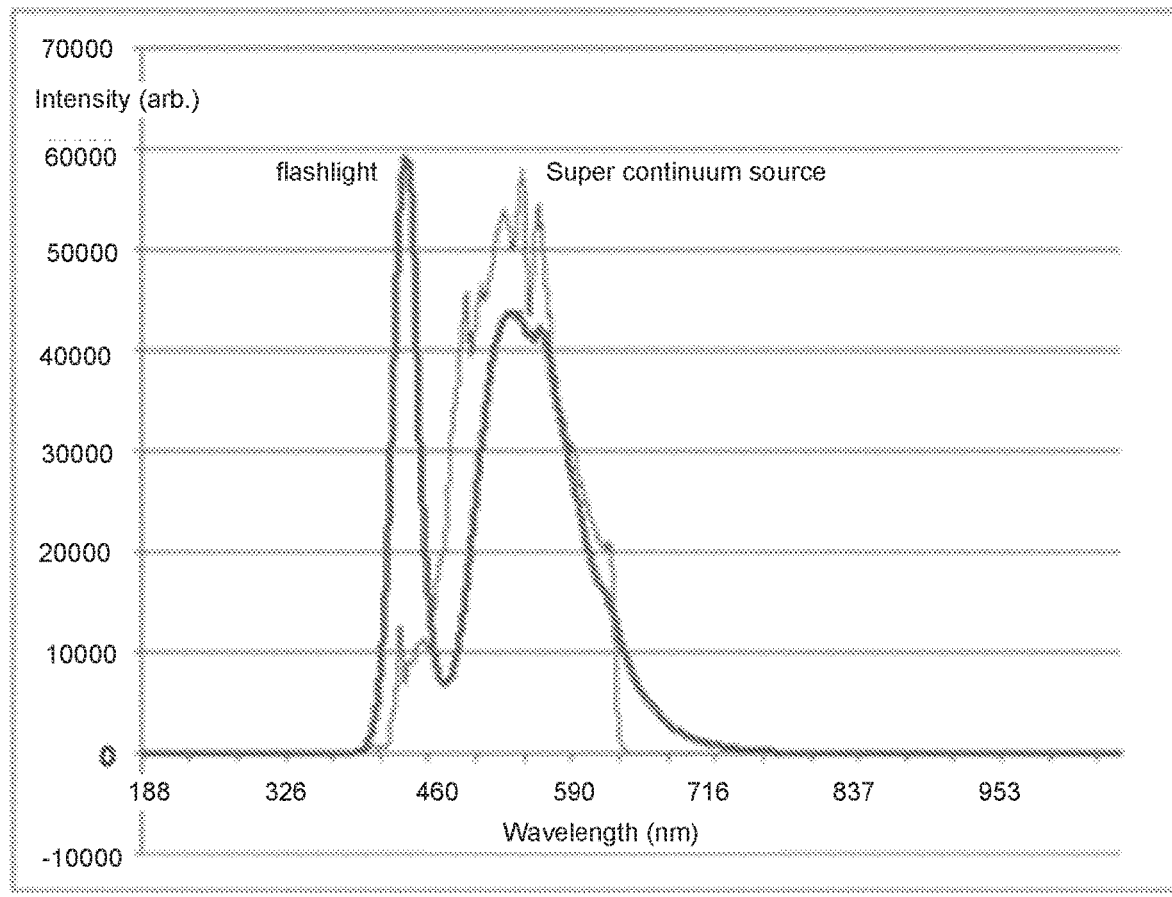
FIG. 19 illustrates measured incident spectra for visible illumination in accordance with an embodiment of the present invention.

FIG. 19 depicts measured incident spectra for visible illumination. Results are depicted for a flashlight and a super continuum source. The results are displayed using a graph with wavelength in nanometers as the horizontal axis and intensity as the vertical axis.

Incident spectra are described as follows. In one example, two types of illumination were used for the holograms. The first used a super-continuum source (NKT Photonics) coupled with a tunable filter (Varia from NKT Photonics), which allows us to create spatially coherent light, whose central wavelength and bandwidth can be selected. A narrowband illumination was performed to characterize the color-encoded holograms as described in the main text. For all other holograms, the full visible spectrum was used and the measured incident spectrum from this source is shown in FIG. 19 (blue curve).

The second source used was a collimated white backlight placed about 2 m away from the hologram to ensure that the illumination was collimated. The incident spectrum of this source is shown in FIG. 19 (red curve).

Figure 20:
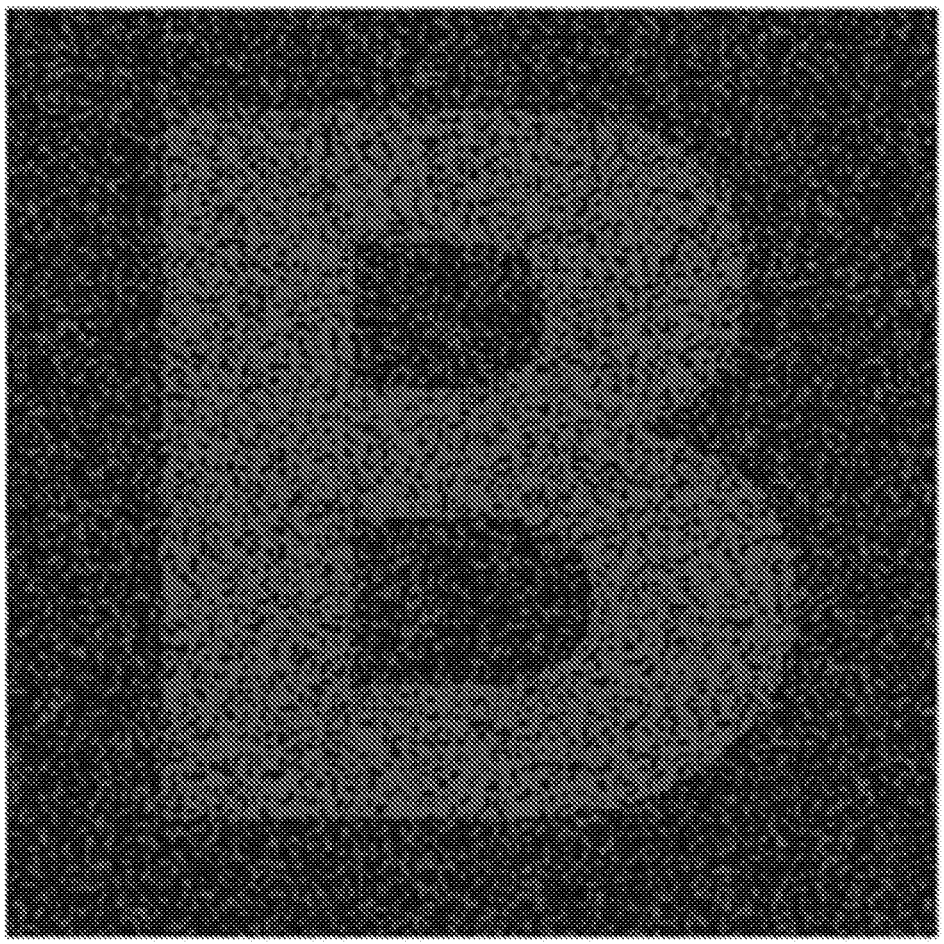
FIG. 20 illustrates simulated image of the color-encoded hologram in accordance with an embodiment of the present invention.
Figure 21:
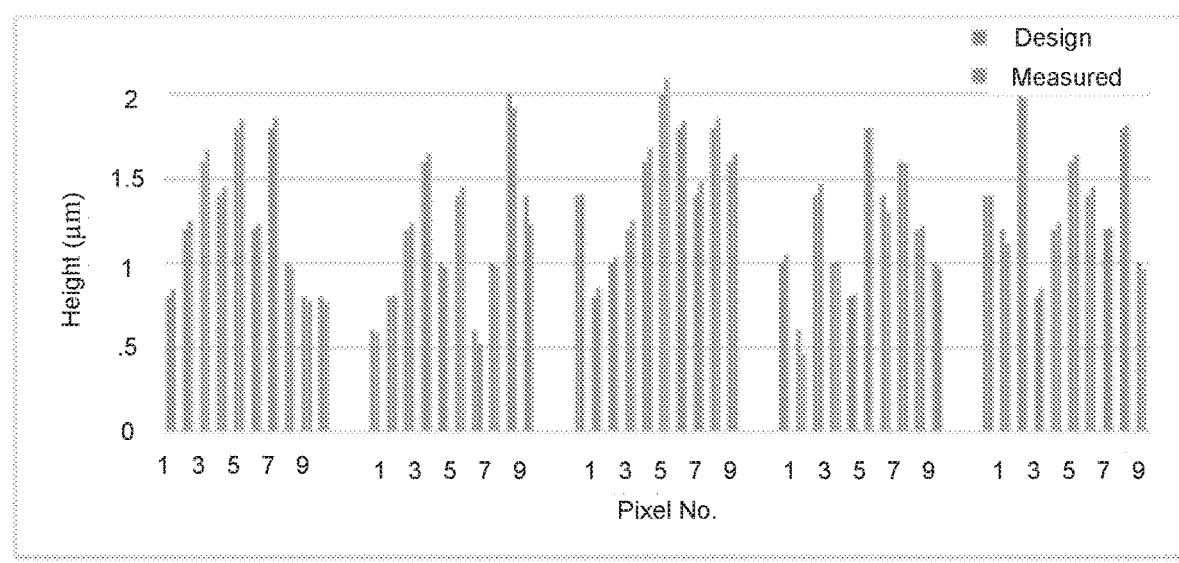
FIG. 21 illustrates measured pixel heights compared to design values in accordance with an embodiment of the present invention.

FIG. 20 depicts simulated image of the color-encoded hologram, when illuminated at k=405 nm. FIG. 21 depicts measured pixel heights compared to design values for 5 rows of pixels for the color-encoded hologram. The design of color-encoded holograms are described as follows. The color-encoded hologram was designed for k=405 nm, 532 nm, 633 nm. Due to the low quantum efficiency of the color sensor, illumination wavelength was set to 415 nm instead of and this result was shown in the main text. The simulated image at the design wavelength in blue, k=405 nm is shown in FIG. 20. The difference is minimal between 415 nm and 405 nm.

Embodiments of metrology of the fabricated color-encoded hologram are described as follows. The pixel heights of the fabricated color-encoded hologram were measured using a stylus profilometer. Five pixel rows were measured for simplicity. The results along with the design values are summarized in FIG. 21. From this data, an average error in pixel height of 46 nm and a standard deviation of 33 nm were estimated.

Embodiments of images captured on sensor are described as follows. In case of the color-encoded hologram, the diffraction efficiencies were determined from the images captured on the color image sensor. The captured images are shown in FIG. 22 which depicts images captured on color sensor for the color-encoded hologram.

Spectral analysis is described as follows. The holograms were designed for three discrete wavelengths: 405 nm, 532 nm and 633 nm. To investigate the spectral response of the hologram designs, the holograms were illuminated at 14 different wavelengths with 10 nm bandwidth. Here, the response of only the color-encoded hologram is presented. The setup shown in FIG. 17 was used for this purpose. For each illumination wavelength, corresponding reconstructed image was captured by the color sensor. In each case, a dark image was also recorded and subtracted from the reconstructed images. These raw images were then normalized and processed or converted into gray scale images. Both the raw and processed grayscale images are presented in FIG. 23. FIG. 23 depicts experimental images of the color-encoded hologram at different wavelengths.

Figure 24:
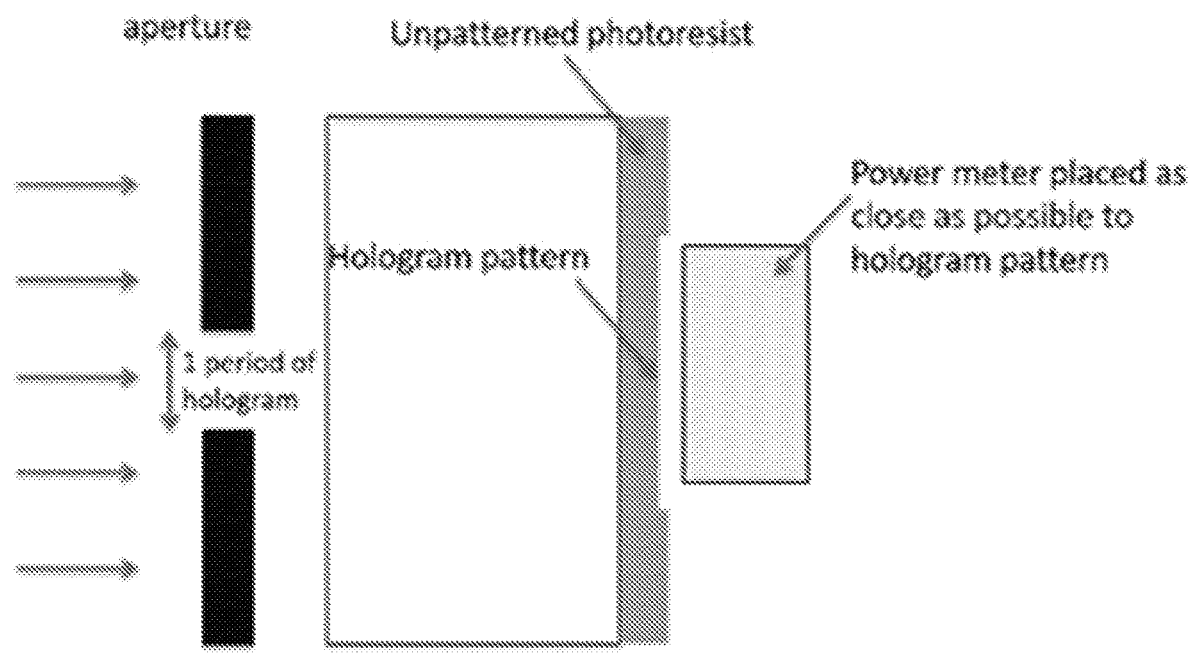
FIG. 24 illustrates a schematic of a setup used to measure the transmission efficiency of the holograms in accordance with an embodiment of the present invention.

FIG. 24 depicts setup used to measure the transmission efficiency of the holograms. Calculation of transmission and diffraction efficiency are described as follows. An aperture with dimension equal to one period of the hologram design was placed in front of it (see FIG. 24). A power meter (PM 100A-1730C sensor, Thorlabs) was used to measure the power of the transmitted beam through the hologram pattern, unpatterned photoresist and aperture. Absolute transmission efficiency was then calculated by taking the ratio of the power through the hologram pattern and power through the aperture. Ratio of the power through the hologram pattern and unpatterned photoresist was used to calculate the relative transmission efficiency.

To determine the diffraction efficiency of the color-encoded hologram experimentally, the ratio of the intensity integrated over the letters to the intensity over one period was calculated from the images captured by the sensor. Corresponding dark images were subtracted in each case.

Figure 25:
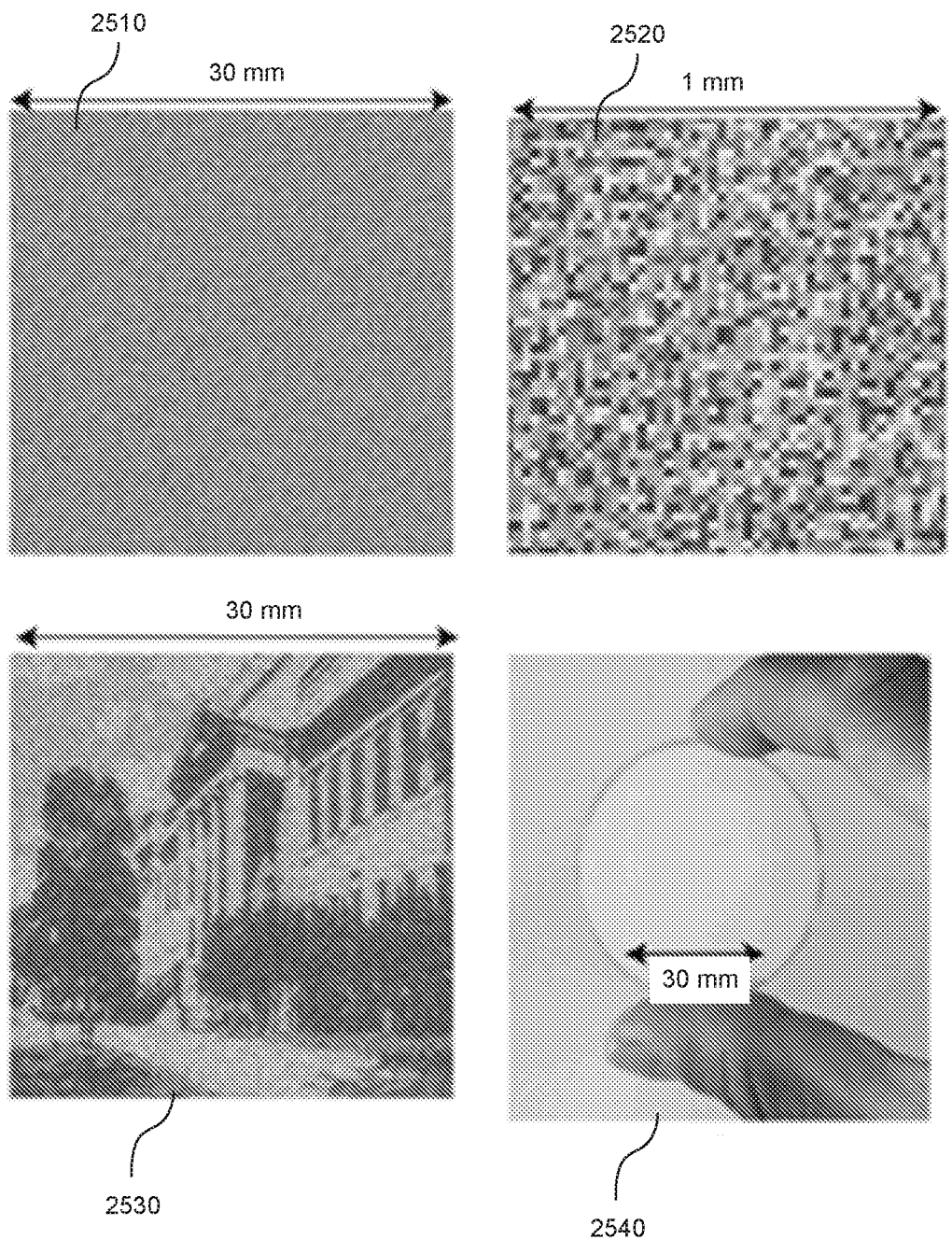
FIG. 25 illustrates a hologram of photograph with 1500× 1500 pixels in accordance with an embodiment of the present invention.

FIG. 25 depicts holograms and photographs. Image 2510 depicts a designed height distribution with 1500×1500 pixels. Image 2520 depicts 50×50 pixels taken from the top left corner of image 2510. Image 2530 is a simulated image. Image 2540 is a photograph of fabricated device. The design of a 1500×1500 pixel hologram is described as follows. As described in the main text, a high-resolution hologram was designed that projects a photographic image. In this case, 1500×1500 pixels were used for one period. The distance between hologram and the image was 1 m. The designed height distribution of this device is shown in image 2510 and 50×50 pixels in the top left corner are shown in image 2520 The simulated image is shown in image 2530. A photograph of the fabricated device is shown in image 2540.

Figure 26:
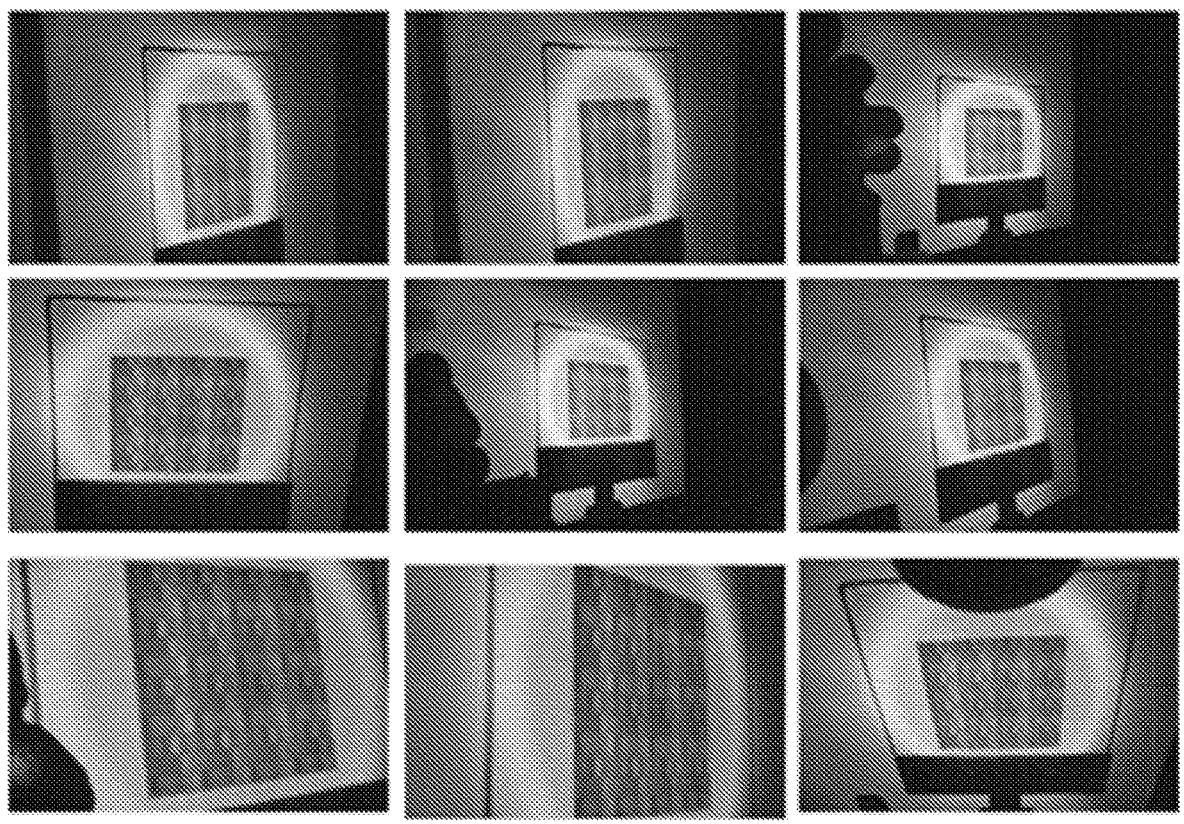
FIG. 26 illustrates images of the Macbeth hologram result at various viewing angle in accordance with an embodiment of the present invention.
Figure 27:
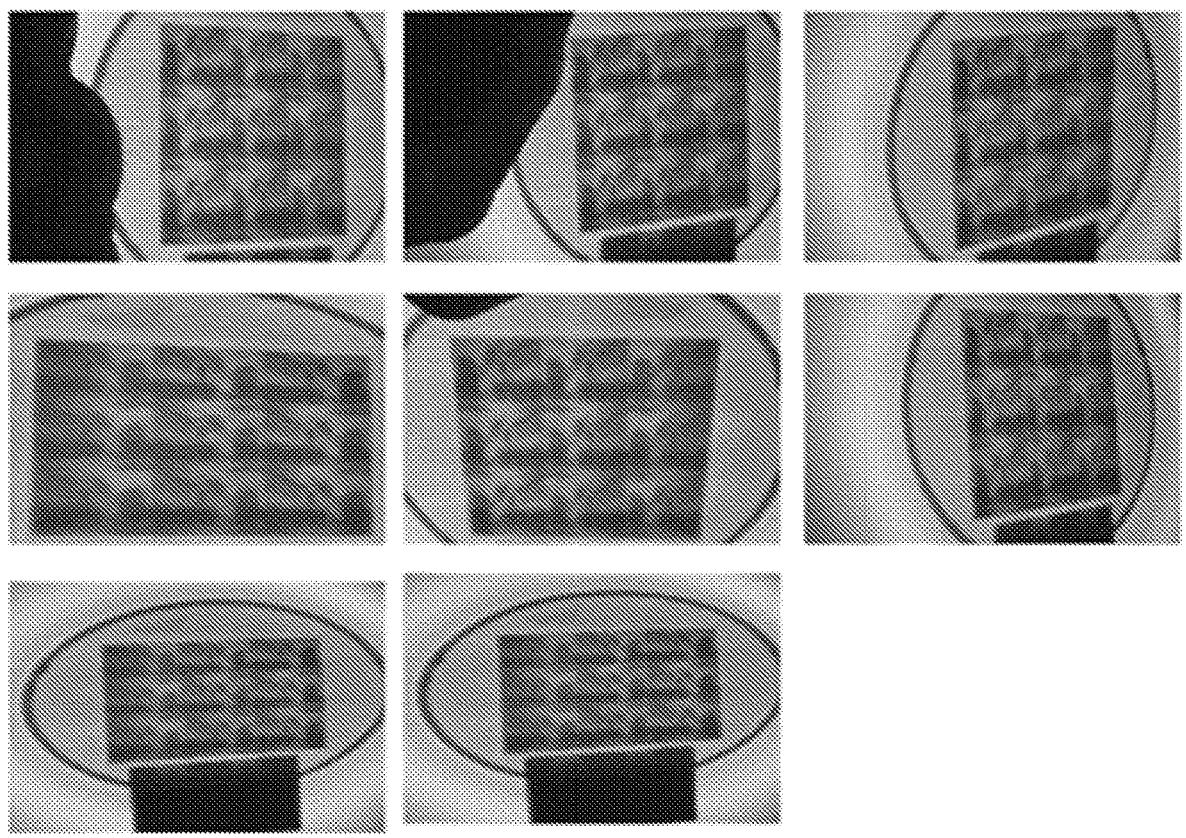
FIG. 27 illustrates images of the color-photograph hologram result at various viewing angles in accordance with an embodiment of the present invention.

FIG. 26 depicts a series of images of the Macbeth hologram result at various viewing angles. FIG. 27 depicts images of the color-photograph hologram result at various viewing angles.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A diffractive optic device, comprising:
   a lens configured to convey a hologram, comprising:
      a patterned material formed with an array of cells having a non-planar arrangement of cell heights extending from a surface of the patterned material, wherein the non-planar arrangement produces the hologram in the near field or quasi-near field; and
      an optional filling material to fill gaps on at least a portion of the surface of the patterned material.

2. The diffractive optic device of claim 1, wherein the filling material is present and has a refractive index different from the patterned material.

3. The diffractive optic device of claim 1, wherein the filling material is present and forms a flat surface above the arrangement of cell heights and the diffractive optic device is a planar lens.

4. The diffractive optic device of claim 1, wherein the hologram is passively conveyed by incoming light reflecting off the cell heights of the patterned material.

5. The diffractive optic device of claim 1, wherein the hologram is conveyed in transmission by incoming light.

6. The diffractive optic device of claim 1, wherein the hologram is passively conveyed by incoming light reflecting off the cell heights of the patterned material.

7. The diffractive optic device of claim 1, wherein the filling material is present and transparent to the incoming light.

8. The diffractive optic device of claim 1, wherein the filling material is present and is not transparent to the incoming light when the hologram is conveyed by reflecting off of the cell heights of the patterned material.

9. The diffractive optic device of claim 1, wherein incoming light incident upon the lens is selected from the group consisting of: visible light, near infrared (IR) light, IR light, ultraviolet (UV) light, Terahertz radiation, Microwave radiation, Radio waves, and any portion of the electromagnetic spectrum and combinations thereof.

10. The diffractive optic device of claim 1, wherein incoming light incident upon the lens is selected from the group of incoming light consisting of: narrowband light, broadband light, light with narrow angle of incidence, light with broad angles of incidence, polarized, partially polarized or unpolarized light, and combinations thereof.

11. The diffractive optic device of claim 1, wherein the lens is embedded in an object.

12. The diffractive optic device of claim 11, wherein the object is selected from the group consisting of: an active display, a passive display, a currency note, a credit card, an identification card, a ticket, a label, a document, packaging, and combinations thereof.

13. The diffractive optic device of claim 11, wherein the object comprises a multi-layer stack and the lens is embedded between at least two of the layers.

14. The diffractive optic device of claim 1, wherein the cell heights comprise preselected cell heights for a substantially optimized performance metric of the diffractive optic across a plurality of discrete wavelengths.

15. The diffractive optic device of claim 1, wherein the cell heights comprise preselected cell heights for a substantially optimized performance metric of the diffractive optic across a broadband of wavelengths.

16. The diffractive optic device of claim 1, wherein the cell heights comprise preselected cell heights such that the hologram is formed in at least one of a single plane, multiple discrete planes, and a continuous 3D volume.

17. The diffractive optic device of claim 1, wherein the cell heights comprise preselected cell heights such that the hologram is a function of at least one of wavelength, incident angle, and polarization.

18. The diffractive optic device of claim 1, wherein the cell heights comprise preselected cell heights such that the diffractive optic device forms a microlens array such that a chief ray acceptance angle of an image sensor is increased.

19. The diffractive optic device of claim 1, further comprising at least two patterned materials each forming a non-planar arrangement of cell heights such that the at least two patterned materials collectively form an image or plurality of images.

20. The diffractive optic of claim 1, wherein the hologram is a wavelength-multiplexing hologram such that the hologram generates a first image using a first incoming light with a first illumination wavelength and the hologram generates a second image using a second incoming light with a second illumination wavelength.

21. The diffractive optic of claim 1, wherein the hologram is an angle-multiplexing hologram such that the hologram generates a first image using light with a first angle of illumination and a the hologram generates a second image using light with a second angle of illumination.

22. The diffractive optic of claim 1, wherein the hologram can form multiple images where each image of the multiple images are formed in a different plane.

23. The diffractive optic of claim 1, wherein diffractive optical device is used as a lens for forming images in another device such as a camera, a wide-field of view camera, a telescope, or a microscope.

24. The diffractive optic of claim 1, wherein the hologram is a wavelength-multiplexing hologram optimized over multiple wavelengths.

25. The diffractive optic of claim 1, wherein the hologram is an angle-multiplexing hologram optimized over multiple angles.

26. A method of manufacturing a lens for a diffractive optic device, comprising:
    forming a patterned material on a surface of a substrate with an array of cells having a non-planar arrangement of cell heights extending from the surface of the substrate such that incoming light reflected from or transmitted through patterned material forms a hologram, wherein the non-planar arrangement produces the hologram in the near field or quasi-near field; and
    optionally depositing a filling material to fill gaps formed in the pattern material.

* * * * *